US009497673B2

(12) United States Patent
Blankenship et al.

(10) Patent No.: US 9,497,673 B2
(45) Date of Patent: Nov. 15, 2016

(54) METHOD AND APPARATUS TO ENABLE MULTIPLE WIRELESS CONNECTIONS

(71) Applicant: BLACKBERRY LIMITED, Waterloo (CA)

(72) Inventors: Yufei Wu Blankenship, Kildeer, IL (US); Shiwei Gao, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 120 days.

(21) Appl. No.: 14/069,532

(22) Filed: Nov. 1, 2013

(65) Prior Publication Data
US 2015/0124708 A1    May 7, 2015

(51) Int. Cl.
H04W 36/00    (2009.01)
H04W 36/08    (2009.01)
H04W 12/08    (2009.01)

(52) U.S. Cl.
CPC ......... H04W 36/0083 (2013.01); H04W 36/08 (2013.01); H04W 12/08 (2013.01); H04W 36/0077 (2013.01)

(58) Field of Classification Search
CPC .............. H04W 36/0083; H04W 36/0094; H04W 12/04; H04W 12/08; H04W 36/08
See application file for complete search history.

(56) References Cited

U.S. PATENT DOCUMENTS

| 8,644,244 | B2 | 2/2014 | Sexton |
| 8,670,422 | B2 | 3/2014 | Lewis |
| 8,787,186 | B2 | 7/2014 | Sexton |
| 2007/0149191 | A1* | 6/2007 | Wu ................. H04W 48/16 455/434 |
| 2008/0268833 | A1 | 10/2008 | Huang et al. |
| 2009/0238114 | A1* | 9/2009 | Deshpande ......... H04J 11/0069 370/328 |
| 2009/0307556 | A1 | 12/2009 | Cai et al. |
| 2009/0310487 | A1 | 12/2009 | Eriksson |
| 2010/0322227 | A1 | 12/2010 | Luo |
| 2011/0014891 | A1* | 1/2011 | Bleckert ............. G08B 27/006 455/404.1 |
| 2011/0105144 | A1 | 5/2011 | Siomina et al. |
| 2011/0158171 | A1 | 6/2011 | Centonza et al. |
| 2011/0170506 | A1 | 7/2011 | Zisimopoulous et al. |
| 2011/0216712 | A1 | 9/2011 | Yang et al. |
| 2013/0137469 | A1 | 5/2013 | Schmidt et al. |

(Continued)

FOREIGN PATENT DOCUMENTS

EP    2273818 A1    1/2011
EP    2627121        8/2013

(Continued)

OTHER PUBLICATIONS

3GPP TS 33.401 V8.4.0, Technical Specification, 3rd Generation Partnership Project; Technical Specification Group Services and System Aspects; 3GPP System Architecture Evolution (SAE): Security architecture; (Release 8), Jun. 2009 (95 pages).

(Continued)

Primary Examiner — Chi H Pham
Assistant Examiner — Weibin Huang
(74) Attorney, Agent, or Firm — Trop Pruner & Hu, P.C.

(57) ABSTRACT

A first radio connection is established between a first cell and a user equipment (UE). A network identity of a second cell is determined based on a first set of at least one network identity associated with the first cell, where the second cell is associated with a second set of at least one network identity. The determined network identity is useable for establishing a second radio connection between the second cell and the UE.

19 Claims, 9 Drawing Sheets

(56) References Cited

U.S. PATENT DOCUMENTS

| | | | |
|---|---|---|---|
| 2013/0143569 A1 | 6/2013 | Kapoor et al. | |
| 2013/0337778 A1* | 12/2013 | Ye | H04W 36/0083 455/411 |
| 2014/0036664 A1 | 2/2014 | Han et al. | |
| 2014/0086173 A1* | 3/2014 | Sadeghi | H04L 5/005 370/329 |
| 2014/0098788 A1* | 4/2014 | Uemura | H04W 24/10 370/331 |
| 2014/0204771 A1* | 7/2014 | Gao | H04W 36/28 370/252 |
| 2014/0254476 A1 | 9/2014 | Blankenship et al. | |
| 2014/0269632 A1 | 9/2014 | Blankenship et al. | |
| 2014/0308921 A1* | 10/2014 | Zhang | H04W 12/04 455/410 |
| 2014/0328182 A1 | 11/2014 | Gao et al. | |
| 2015/0036566 A1 | 2/2015 | Blankenship et al. | |
| 2015/0045038 A1 | 2/2015 | Gao et al. | |

FOREIGN PATENT DOCUMENTS

| | | |
|---|---|---|
| WO | 2009086991 | 7/2009 |
| WO | 2011022731 | 2/2011 |
| WO | 2015013858 A1 | 2/2015 |

OTHER PUBLICATIONS

3GPP TR 33.821 V8.0.0, Technical Report, 3rd Generation Partnership Project; Technical Specification Group Services and System Aspects; Rationale and track of security decisions in Long Term Evolved (LTE) RAN / 3GPP System Architecture Evolution (SAE) (Release 8), Mar. 2009 (137 pages).
3GPP TS 36.300 V10.3.0, Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Mar. 2011 (197 pages).
3GPP TS 36.331 V11.0.0, Technical Specification, 3rd Generation Partnership Project; Technical Specification Group Radio Access Network; Evolved Universal Terrestrial Radio Access (E-UTRA); Radio Resource Control (RRC); Protocol specification (Release 11), Jun. 2012 (302 pages).
3GPP TS 36.413 V11.1.0, Technical Specification, 3rd Generation Partnership Project; Technical Specification Group Radio Access Network; Evolved Universal Terrestrial Radio Access Network (E-UTRAN); S1 Application Protocol (S1AP) (Release 11), Sep. 2012 (262 pages).
3GPP TS 36.423 V11.2.0, Technical Specification, 3rd Generation Partnership Project; Technical Specification Group Radio Access Network; Evolved Universal Terrestrial Radio Access Network (E-UTRAN); X2 application protocol (X2AP) (Release 11), Sep. 2012 (136 pages).
3GPP TR 36.806 V9.0.0, Technical Report, 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010 (34 pages).
3GPP TR 36.839 V11.1.0, Technical Report, 3rd Generation Partnership Project; Technical Specification Group Radio Access Network; Evolved Universal Terrestrial Radio Access (E-UTRA); Mobility enhancements in heterogeneous networks (Release 11), Dec. 2012 (53 pages).
3GPP TR 36.912 V11.0.0, Technical Report, 3rd Generation Partnership Project; Technical Specification Group Radio Access Network; Feasibility study for Further Advancements for E-UTRA (LTE-Advanced) (Release 11), Sep. 2012 (62 pages).
Han et al., Capacity Analysis of Generalized Distributed Wireless Communication System and Transmit Antenna Selection for Maximization of Average Capacity, IEEE 2004 (5 pages).

Shan-Yuan Hol, Data Fusion in a Relay Network, SIT 2008, Toronto, Canada, Jul. 6-11, 2008 (5 pages).
Vasken Genc et al., IEEE 802.16J Relay-Based Wireless Access Networks: An Overview, Oct. 2008 (8 pages).
Kerpez et al., IEEE Transactions on Vehicular Technology, Vol. 45, No. 2, 265—A Radio Access System with Distributed Antennas, May 1996 (11 pages).
David Soldani et al., Radio Communications Series, Nokia Siemens Networks, Wireless Relays for Broadband Access, Mar. 2008 (9 pages).
[Draft] 3GPP TR 36.392 V0.1.0 Technical Report 3rd Generation Partnership Project; Technical Specification Group Radio Access Network; Scenarios and Requirements for Small Cell Enhancement for E-UTRA and E-UTRAN; (Release 12) (Oct. 2012) (12 pages).
Zhijun Cai et al., U.S. Appl. No. 13/968,642 entitled Coordinating Allocation of Resources for Use by Small Cells, filed Aug. 16, 2013 (34 pages).
Yajun Zhu et al., U.S. Appl. No. 14/002,371 entitled Transmitting a Synchronization Indication, filed Aug. 30, 2013 (48 pages).
Yajun Zhu et al., U.S. Appl. No. 14/113,284 entitled Wireless Access Network Node Having an Off State, filed Oct. 22, 2013 (59 pages).
3GPP TS 33.220 V12.1.0 Technical Specification 3rd Generation Partnership Project; Technical Specification Group Services and System Aspects; Generic Authentication Architecture (GAA); Generic Bootstrapping Architecture (GBA) (Release 12) (Jun. 2013) (92 pages).
3GPP TS 33.401 V12.9.0 Technical Specification 3rd Generation Partnership Project; Technical Specification Group Services and System Aspects; 3GPP System Architecture Evolution (SAE); Security architecture (Release 12) (Sep. 2013) (121 pages).
3GPP TS 36.300 V11.7.0 Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) (Sep. 2013) (209 pages).
3GPP TS 36.322 V11.0.0 Technical Specification 3rd Generation Partnership Project; Technical Specification Group Radio Access Network; Evolved Universal Terrestrial Radio Access (E-UTRA); Radio Link Control (RLC) protocol specification (Release 11) (Sep. 2012) (39 pages).
3GPP TS 36.323 V11.2.0 Technical Specification 3rd Generation Partnership Project; Technical Specification Group Radio Access Network; Evolved Universal Terrestrial Radio Access (E-UTRA); Packet Data Convergence Protocol (PDCP) specification (Release 11) (Mar. 2013) (27 pages).
3GPP TS 36.331 V11.5.0 Technical Specification 3rd Generation Partnership Project; Technical Specification Group Radio Access Network; Evolved Universal Terrestrial Radio Access (E-UTRA); Radio Resource Control (RRC); Protocol specification (Release 11) (Sep. 2013) (347 pages).
3GPP TSG-RAN Meeting#57 RP-121236 Chicago, USA, Sep. 4-7, 2012, Source: NTT Docomo, Inc., Title: New Study Item Description: Small Cell Enhancements for E-UTRA and E-UTRAN—Higher-layer Aspects, Document for: Approval, Agenda Item: 13.2 (5 pages).
3GPP TSG RAN#57 RP-121418 Chicago, US, Sep. 4-7, 2012, Source: CMCC, Title: New Study Item Proposal: Scenarios and Requirements of LTE Small Cell Enhancements, Agenda item: 13.2, Document for: Approval (5 pages).
3GPP TR 36.842 V0.3.0 Technical Report 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12) (Aug. 2013) (51 pages).
Zugenmaier et al., NTT Docomo Technical Journal vol. 11 No. 3, Special Articles on SAE Standardization Technology, Security Technology for SAE/LTE, 2009 (4 pages).
European Patent Office, PCT/ISA/206 Form and Communication Relating to the Results of the Partial International Search for PCT/US2014/063308 dated Mar. 4, 2015 (7 pages).

(56) References Cited

OTHER PUBLICATIONS

3GPP TSG RAN WG2 #62bis, R2-083741 (rev of R2-083333), Agenda Item: 6.2.1.3, Source: Alcatel-Lucent, Alcatel-Shanghai Bell, Title: MNC MCC in RRC connection establishment, Document for: Discussion and Decision dated Jun. 30-Jul. 4, 2008 (6 pages).

3GPP TSG-RAN2 Meeting #60, R2-075498, Jeju, South Korea, Change Request, 36.300 CR 006, rev 1, 8.2.0, Title: Clean up and update on security, scheduling, mobility, MBMS and DRX, Source to WG: Nokia Siemens Networks, Nov. 5-9, 2007 (84 pages).

3GPP TSG SA WG3 (Security) meeting #50, S3-080150, Sanya, CN, Agenda Item: 6.9, Source: China Mobile, Huawei, ZTE, SpreadTrum, Title: pCR on TS 33.abc on Key refresh on handover in LTE/SAE, Document for: Discussion and decision, Agenda item: 6.9, Feb. 25-29, 2008 (6 pages).

3GPP TS 36.423 V10.7.0, Technical Specification, 3rd Generation Partnership Project; Technical Specification Group Radio Access Network; Evolved Universal Terrestrial Radio Access Network (E-UTRAN); X2 application protocol (X2AP) (Release 10), Sep. 2013 (132 pages).

European Patent Office, International Search Report and Written Opinion for PCT/US2014/063308 dated May 26, 2015 (18 pages).

\* cited by examiner

METHOD AND APPARATUS TO ENABLE MULTIPLE WIRELESS CONNECTIONS

BACKGROUND

As the demand for wireless data communication using wireless user equipments (UEs) has increased, wireless access service providers are increasingly facing challenges in meeting capacity demands in regions where the density of users is relatively high. To address capacity issues, deployment of small cells has been proposed. A small cell (or multiple small cells) can operate within a coverage area of a larger cell, referred to as a macro cell. A small cell has a coverage area that is smaller than the coverage area of the macro cell. A small cell (or multiple small cells) can also operate outside the coverage area of the macro cell.

If small cells are deployed, then communications with UEs can be offloaded from the macro cell to the small cells. In this way, data communication capacity is increased to better meet data communication demands in regions of relatively high densities of UEs.

BRIEF DESCRIPTION OF THE DRAWINGS

Some embodiments are described with respect to the following figures.

DETAILED DESCRIPTION

Figure 1:
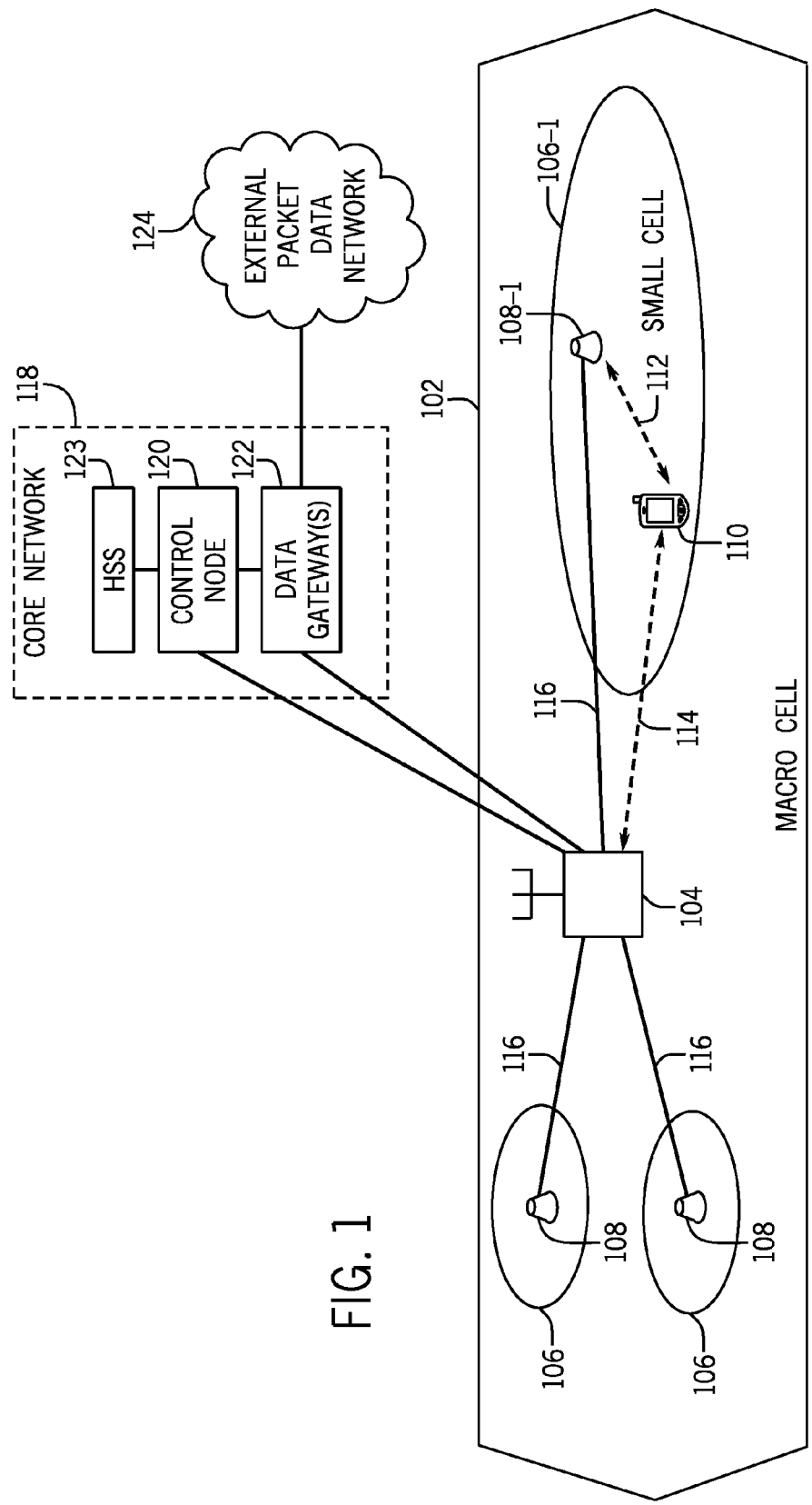
FIG. 1 is a schematic diagram of an example network arrangement that includes macro cells and small cells, in accordance with some implementations.

Services of small cells are provided by small cell wireless access network nodes. Similarly, services of macro cells are provided by macro wireless access network nodes. A macro cell has a coverage area that is generally larger than the coverage area of a small cell provided by a small cell wireless access network node. A wireless access network node is responsible for performing wireless transmissions and receptions with user equipments (UEs) within a coverage area of the cell. A coverage area can refer to a region where mobile services can be provided by a network node to a target level. Examples of UEs can include any of the following: smart phones, personal digital assistants, notebook computers, tablet computers, or any other devices that are capable of wireless communications.

Examples of small cell wireless access network nodes include pico wireless access network nodes, femto wireless access network nodes, relay nodes, and so forth. A pico cell provided by a pico wireless access network node refers to a cell that has a relatively small coverage area, such as within a building, a train station, an airport, an aircraft, or other small area. A femto cell provided by a femto wireless access network node is a cell that is designed for use in a home or small business. A femto cell is associated with a closed subscriber group (CSG), which specifies that only users within a specified group are allowed to access the femto cell. A relay node is used for wirelessly relaying data from one wireless entity to another wireless entity. There can be other examples of small cell wireless access network nodes.

A UE is able to establish multiple concurrent connections with respective wireless access network nodes. For example, a UE can establish a dual connection with a macro wireless access network node and a small cell wireless access network node. In other cases, a UE can establish more than two concurrent wireless connections with respective wireless access network nodes, such as one macro wireless access network node and two or more small cell wireless access network nodes. A UE that establishes multiple concurrent wireless connections with respective wireless access network nodes consumes the radio resources provided by those wireless access network nodes.

To provide security of communications over the air between a UE and a wireless access network node, various keys can be employed. A key can be used for protecting information in a control plane or a user plane. For example, a key can be used for ciphering (encrypting) the information that is communicated between a UE and a wireless access network node. Encryption encodes information using an encryption key to prevent an unauthorized entity from reading the encoded information. A key can also be used for providing information integrity, in which an integrity key can be used to confirm that received information is from an intended source.

A control plane exchanges control signals between a wireless access network node and a UE to perform specified control tasks, such as any or some combination of the following: network attachment of a UE, authentication of the UE, setup of radio bearers for the UE, mobility management to manage mobility of the UE, performance of handover decisions based on neighbor cell measurements sent by the UE, transmission of a paging message to the UE, broadcast of system information, control of UE measurement reporting, and so forth. Although examples of control tasks and control messages in a control plane are listed above, it is noted that in other examples, other types of control messages and control tasks can be provided. More generally, a control plane can perform call control and connection control functions, and can provide messaging for setting up calls or connections, supervising calls or connections, and releasing calls or connections.

A user plane provides communication of traffic data (e.g. voice data, user data, application data, etc.) between a UE and a wireless access network node. User plane functions can also include exchanging control messages between a wireless access network node and a UE associated with communicating the traffic data, such as flow control, error recovery, and so forth.

Traditionally, the UE establishes just one wireless connection with a cell at any one time. As such, only one set of keys has to be provided for protecting communications of the UE. However, in arrangements where a UE can establish multiple concurrent wireless connections with respective cells provided by one or more wireless access network nodes, the derivation of keys for use in protecting communications of the UE over the multiple wireless connections can be more complex.

A UE establishing a wireless connection with a cell refers to the UE establishing a wireless connection with a wireless access network node that provides the cell. A wireless access network node can provide one cell, or alternatively, a wireless access network node can provide multiple cells. For example, a wireless access network node can operate using a number of component carriers, which allows a UE to communicate with the wireless access network node using one or multiple component carriers (at respectively different frequencies). The component carriers can be aggregated together to provide carrier aggregation service for the UE, in which the UE can establish multiple concurrent wireless connections with the wireless access network node on the respective component carriers.

Each of the component carriers can provide a respective cell. Accordingly, a wireless access network node can provide multiple cells on the respective component carriers supported by the wireless access network node.

In accordance with some implementations, techniques or mechanisms are provided to derive keys for multiple concurrent wireless connections of a UE. In some implementations, for a UE that has multiple wireless connections with multiple respective cells, one or more network identities can be selected for use in deriving keys for protecting communications of the UE with the multiple cells. In some implementations, the network identity is an identity of a public land mobile network (PLMN). A PLMN can be identified by a mobile country code (MCC) and a mobile network code (MNC), in some examples. A selected PLMN identity is provided to a network infrastructure for deriving a base key that can be used for deriving other keys used for information encryption or information integrity, or both.

Although reference is made to PLMNs in this disclosure, it is noted that techniques or mechanisms according to some implementations can be applied to other types of networks that are provided by network operators. More generally, a network or mobile communications network can refer to any defined arrangement of network nodes that UEs can wirelessly access for the purpose of performing communications with other endpoints. Different networks can be provided by respective different network operators. In some cases, a network operator can provide multiple networks.

In the present disclosure, reference is made to mobile communications networks that operate according to the Long-Term Evolution (LTE) standards as provided by the Third Generation Partnership Project (3GPP). The LTE standards are also referred to as the Evolved Universal Terrestrial Radio Access (E-UTRA) standards. Although reference is made to E-UTRA in the ensuing discussion, it is noted that techniques or mechanisms according to some implementations can be applied to other wireless access technologies.

In an E-UTRA network, a wireless access network node can be implemented as an enhanced Node B (eNB), which includes functionalities of a base station and base station controller. Thus, in an E-UTRA network, a macro wireless access network node is referred to as a macro eNB (MeNB), while a small cell wireless access network node is referred to as a small cell eNB (SeNB).

FIG. 1 illustrates an example arrangement that includes network nodes that are part of a mobile communications network that supports wireless communications with UEs. A macro cell 102 corresponds to a coverage area provided by a macro eNB 104. Although just one macro cell 102 and the respective macro eNB 104 is shown in FIG. 1, note that there can be additional macro cells and respective macro eNBs.

In addition, a number of small cells 106 are depicted as being within the coverage area of the macro cell 102. Each small cell 106 corresponds to a coverage area provided by a respective small cell eNB 108. One of the small cells is labeled 106-1, and the corresponding small cell eNB is labeled 108-1.

A wireless UE 110 within the coverage area of the small cell 106-1 is able to wirelessly communicate with the small cell eNB 108-1. The UE 110 is also able to wirelessly communicate with the macro eNB 104. Although just one UE 110 is depicted in FIG. 1, it is noted that multiple UEs may be present in coverage areas of each of the small cells 106 as well as within the coverage area of the macro cell 102.

A first wireless connection 112 can be established between the UE 110 and the small cell eNB 108-1. In addition, a second wireless connection 114 can be established between the UE 110 and the macro eNB 104. In such an arrangement, the UE 110 is considered to have established dual (i.e. concurrent) wireless connections with the macro eNB 104 and the small cell eNB 108-1. In other examples, the UE 110 can establish multiple concurrent wireless connections with the macro eNB 104 and with multiple small cell eNBs 108. In yet another example, the small cell eNBs may be outside of the coverage of a macro eNB, and the UE can establish multiple concurrent wireless connections with multiple small cell eNBs.

FIG. 1 also shows a backhaul link 116 between the macro eNB 104 and each of the small cell eNBs 108. The backhaul link 116 can represent a logical communication link between two nodes; the backhaul link 116 can either be a direct point-to-point link or can be routed through another communication network or node. In some examples, the backhaul link 116 is a wired link. In other examples, the backhaul link 116 is a wireless link. Although not shown, backhaul links may also be provided between small cell eNBs 108.

In some implementations, the macro cell 102 (and more specifically the macro eNB 104) can provide all of the control plane functions, while a small cell 106 (more specifically the corresponding small cell eNB 108) provides at least a portion of the user plane functions for a dual-connection capable UE (i.e. a UE that is capable of concurrently connecting to two cells controlled by two separate eNBs). Note that the macro eNB 104 can also provide user plane functions for the dual-connection capable UE.

Although FIG. 1 shows each eNB (macro eNB 104 or small cell eNB 108) providing a respective cell, it is noted that an eNB can also provide multiple cells. For example, an eNB can operate using a number of component carriers, which allows a UE to communicate with the eNB using one or multiple component carriers (which are at respective different frequencies). The component carriers can be aggregated together to provide carrier aggregation service for the UE. Each of the component carriers can provide a respective cell.

A small cell connection can be added to or removed from a UE under the control of the macro eNB 104. In some implementations, the action of adding or removing a small cell for a UE can be transparent to a core network 118 of the mobile communications network. The core network 118 includes a control node 120 and one or more data gateways 122. The data gateway(s) 122 can be coupled to an external packet data network (PDN) 124, such as the Internet, a local area network (LAN), a wide area network (WAN), and so forth.

In an E-UTRA network, the control node 120 in the core network 118 can be implemented as a mobility management entity (MME). An MME is a control node for performing various control tasks associated with an E-UTRA network. For example, the MME can perform idle mode UE tracking and paging, bearer activation and deactivation, selection of a serving gateway (discussed further below) when the UE initially attaches to the E-UTRA network, handover of the UE between macro eNBs, authentication of a user, generation and allocation of a temporary identity to a UE, and so forth. In other examples, the MME can perform other or alternative tasks.

In an E-UTRA network, the data gateway(s) 122 of the core network 118 can include a serving gateway (SGW) and a packet data network gateway (PDN-GW). The SGW routes and forwards traffic data packets of a UE served by the SGW. The SGW can also act as a mobility anchor for the user plane during handover procedures. The SGW provides connectivity between the UE and the PDN 124. The PDN-GW is the entry and egress point for data communicated between a UE in the E-UTRA network and a network element coupled to the PDN 124. There can be multiple PDNs and corresponding PDN-GWs. Moreover, there can be multiple MMEs and SGWs.

Note that a legacy UE (a UE that is not capable of establishing multiple concurrent wireless connections with multiple cells belonging to different eNBs, such as a macro cell and one or more small cells) can connect to either a macro cell or a small cell using traditional wireless connection techniques.

When a UE moves under the coverage of a small cell 106, the macro eNB 104 may decide to offload some of the user plane traffic to the small cell. This offload is referred to as a data offload. When a data offload has been performed from the macro cell 104 to the small cell 106, then a UE that has a dual connection can transmit or receive data to and from the corresponding small cell wireless access network node 108. Additionally, the UE 110 can also communicate user plane traffic with the macro eNB 104. Although reference is made to data offload to one small cell, it is noted that in other examples, the macro cell 104 can perform data offload for the UE 110 to multiple small cells.

FIG. 1 also shows that the core network 118 includes a home subscriber server (HSS) 123, which includes a database that stores user-related and subscriber-related information. The HSS 123 provides support functions in mobility management, call and session setup, user authentication, access authorization, and so forth.

In addition, the HSS 123 is also responsible for producing a base key that is useable for deriving other keys for protecting communications of a UE. Protecting communications of a UE can refer to encrypting information sent by or to the UE, or providing information integrity of information sent by or to the UE.

Figure 2:
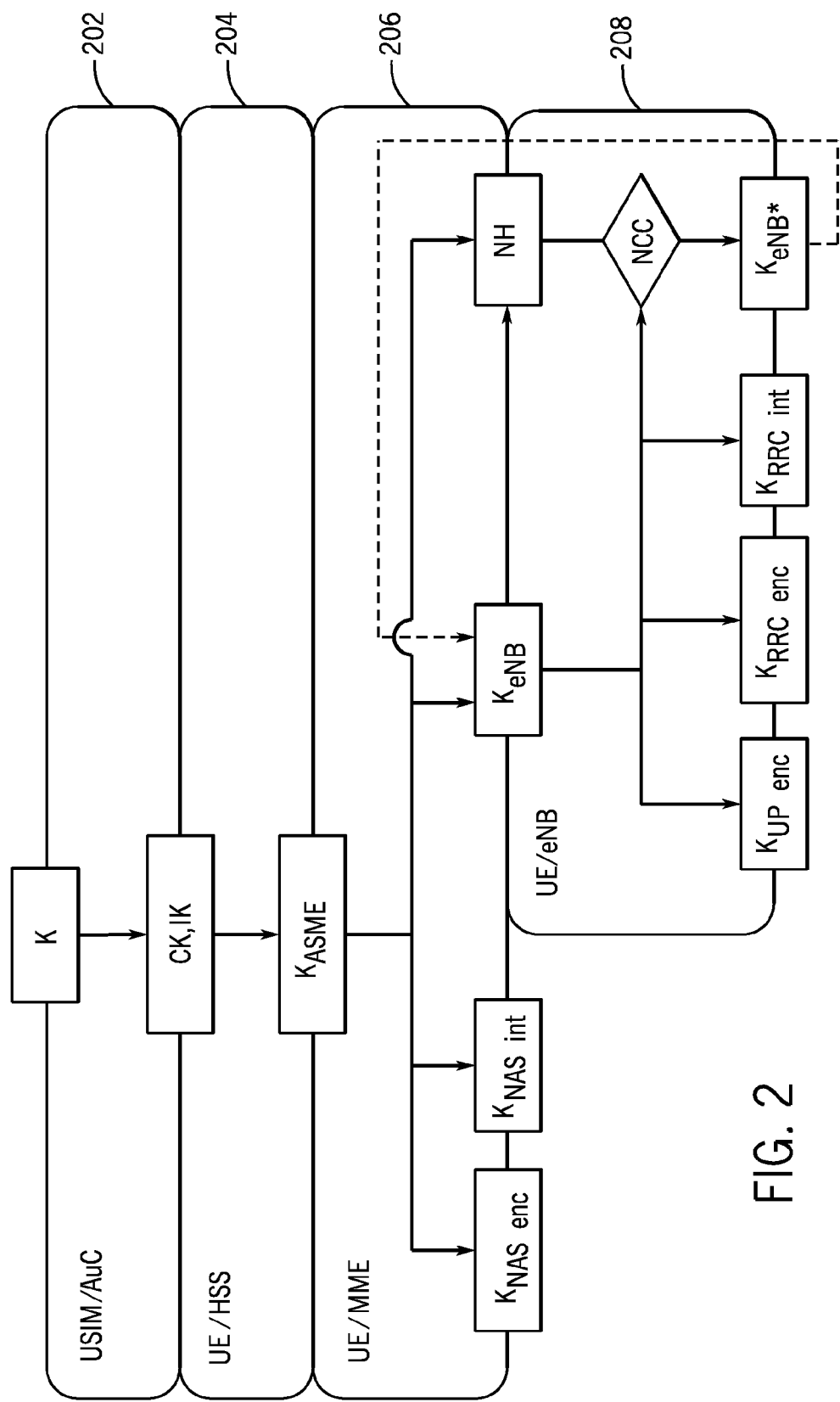
FIG. 2 is a schematic diagram of an example key hierarchy for a single wireless connection between a user equipment (UE) and a wireless access network node.

An example key hierarchy provided by E-UTRA is shown in FIG. 2. In FIG. 2, various entities at different hierarchical levels are shown along with the keys in the key hierarchy produced by these entities. Each hierarchical level shown in FIG. 2 includes an entity on the UE side, an entity on the network side, for producing a respective key(s) of the key hierarchy. In the example of FIG. 2, a first level 202 includes a Universal Subscriber Identity Module (USIM) in a UE or an authentication center (AuC) in the core network 118. The USIM can provide certain security functions on the UE side, including key generation. A second level 204 includes the UE and the HSS 123. A third level 206 includes the UE and the MME 120. A fourth level 208 includes the UE and an eNB.

The "base key" mentioned above that is generated based on a selected PLMN identity is referred to as $K_{ASME}$ in an E-UTRA network. The base key $K_{ASME}$ is produced by a UE or the HSS 123. As shown in FIG. 2, a permanent key K is used by a USIM in the UE and by an AuC in the core network 118 to produce a key CK for encryption and a key IK for integrity protection. The key pair, CK and IK, is passed by the USIM to the UE and by the AuC to the HSS 123. The base key, $K_{ASME}$, is generated from the key pair, CK and IK, using a key generation function based on an identity of a serving network (serving PLMN) which serves the UE.

The base key $K_{ASME}$ is passed by the HSS 123 to the MME 120 in the core network 118. The base key $K_{ASME}$ is also passed between components inside the UE.

From $K_{ASME}$, the UE or MME 120 can produce keys for protection of non-access stratum (NAS) information provided by a NAS layer in the UE or MME 120. The NAS layer is used for managing the establishment of communication sessions and for maintaining communication sessions between the UE and an eNB. Examples of tasks of an NAS layer include mobility management, session management, and identity management.

In contrast, an access stratum (AS) layer is responsible for transporting bearer data over a wireless connection between a UE and an eNB.

The keys for protection of NAS information include $K_{NASenc}$ (for encrypting the NAS information) and $K_{NASint}$ (for integrity protection of NAS information).

The base key $K_{ASME}$ is also used by the UE and MME to produce $K_{eNB}$, which can be more generally referred to as an access network node key. The access network node key $K_{eNB}$ is used for the derivation of other keys, as further illustrated in FIG. 2, which are used for protecting AS information produced by an AS layer in the UE or eNB.

Note that $K_{eNB}$ can also be derived by a target eNB from a Next Hop (NH) during handover from a source eNB to the target eNB. The NH is used by the UE and an eNB for the derivation of $K_{eNB}^*$, which is used by the UE and the target eNB as a new $K_{eNB}$ for Radio Resource Control (RRC) information and user plane information. An RRC entity in the UE or an eNB is used for establishing an RRC connection, which is an example of a radio connection. RRC is described further in 3GPP TS 36.331, in some examples. Although reference is made to an RRC connection (for carrying control plane messages) as an example of a radio connection, it is noted that in other examples, other types of radio connections can be established between a UE and a wireless access network node, including radio connection to transfer data payload (i.e. user plane message).

At the UE or eNB, $K_{eNB}$ can be used for producing the following keys: $K_{UPenc}$ (for encrypting user plane data), $K_{RRCenc}$ (for encrypting RRC information), and $K_{RRCint}$ (for providing integrity protection for RRC information). Note that each of $K_{UPenc}$, $K_{RRCenc}$, and $K_{RRCint}$ is produced from $K_{eNB}$ and a respective algorithm type distinguisher. Different algorithm type distinguishers identify respective different algorithms that are used for producing the respective keys $K_{UPenc}$, $K_{RRCenc}$, and $K_{RRCint}$ from $K_{eNB}$.

FIG. 2 also shows the derivation of $K_{eNB}^*$ based on NH and a Next Hop Chaining Count (NCC), which is a counter related to NH. NCC indicates the amount of key chaining that has been performed, which allows the UE to be synchronized with the eNB and to determine whether the next $K_{eNB}^*$ is to be based on the current $K_{eNB}$ or a fresh NH.

Network Identity Selection

As noted above, a UE or HSS produces $K_{ASME}$ (or more generally, a base key) using an identity of a serving PLMN. On the core network side, the PLMN identity is provided to a home environment (HE), which refers to a core network infrastructure that has the responsibility for provision of a service or set of services to users associated with a subscription. The home environment can include the HSS 123, in some examples.

The PLMN identity is provided by an eNB to the MME 120. The MME 120 can prepare an authentication data request that includes an international mobile subscriber identity (IMSI) of a UE, the serving PLMN identity, and a network type (e.g. E-UTRA network or some other network type). The HSS 123, in response to the authentication data request, can generate $K_{ASME}$ using the serving PLMN identity (and based on the key pair, CK and IK, shown in FIG. 2).

In some implementations, for a UE that has concurrent wireless connections with the macro eNB and one or more small cell eNBs, one PLMN identity, which is common to the macro eNB and the small cell eNB(s), is selected. In alternative implementations, different PLMN identities can be selected for the macro eNB and the small cell eNB(s).

Figure 3:
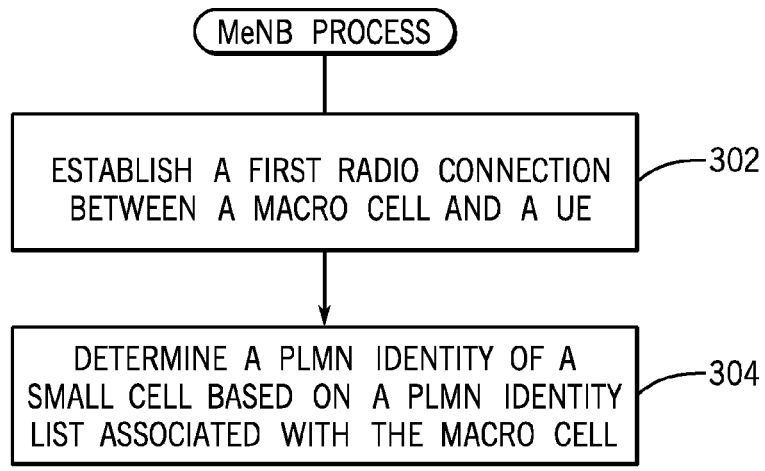
FIG. 3 is a flow diagram of a process of a macro wireless access network node, according to some implementations.

FIG. 3 is a flow diagram of a process of a macro eNB, according to some implementations. The macro eNB establishes (at 302) a first radio connection between a macro cell and a UE. In addition, the macro eNB determines (at 304) a PLMN identity of a small cell (to which the UE is to establish connection as part of dual connectivity or multiple connectivity), based on a PLMN identity list associated with the macro cell. Note that each cell (e.g. macro cell and small cell) is associated with a respective PLMN identity list (which can be referred to as plmn-IdentityList). More generally, each cell is associated with a respective set of one or more network identities.

The PLMN identity of the small cell determined (at 304) is useable for establishing a second radio connection between a small cell and the UE. More specifically, according to some examples, the determined small cell PLMN identity is communicated in RRC messaging with the UE (which can be exchanged between the macro eNB or the small cell eNB and the UE) for setting up an RRC connection.

The ensuing discussion assumes that the UE is to establish a dual connection with a macro cell and a small cell. It is noted that the described techniques or mechanisms can also be applied in scenarios where the UE is to establish concurrent connections with more than two cells, or to establish concurrent connections with two cells of the same type (e.g. two small cells).

Selecting a Common PLMN Identity

In accordance with some implementations, the PLMN identity that is determined (at 304) is a PLMN identity that is common to both the macro cell and the small cell to which the UE is to establish a dual connection. This common PLMN identity is provided by the macro eNB to the MME 120, which can in turn forward the common PLMN identity to the HSS 123 for use in deriving $K_{ASME}$.

The macro eNB can identify the one or more PLMN identities that are common between the plmn-IdentityList of the macro cell and the plmn-IdentityList of the small cell. The identified common PLMN identity (or identities) is (are) stored in a data structure, such as plmn-IdentityList_dual. The data structure, plmn-IdentityList_dual, lists a subset of one or more PLMN identities that are common between the plmn-IdentityList of the macro cell and the plmn-IdentityList of the small cell.

In some implementations, there is one plmn-IdentityList_dual for each pair of a macro cell and a small cell to which a UE can establish dual connectivity; such a pair can be referred to as a dual-connectivity pair. Note that a dual connectivity relationship between a macro cell and a small cell is a cell-to-cell relationship, instead of an eNB-to-eNB relationship. Different dual-connectivity pairs of macro cells and small cells are associated with respective plmn-IdentityList_dual's. For example, for a given macro cell, e.g. macro_cell_A, a first plmn-IdentityList_dual is provided for dual-connectivity pair {macro_cell_A, small_cell_B}, while a second plmn-IdentityList_dual is provided for dual-connectivity pair {macro_cell_A, small_cell_C}.

In other implementations, if two or more small cells can serve the UE in addition to the macro cell, then PLMN identity (or identities) common to the macro cell and the two or more small cells would be identified and included in plmn-IdentityList_dual.

The content of the data structure, plmn-IdentityList_dual, can be established when a macro eNB and small cell eNB contact each other to establish the interface between the macro eNB and the small cell eNB. This interface between the macro eNB and the small cell eNB can be referred to as an Xn interface, as described in 3GPP TR 36.842. Alternatively, the data structure, plmn-IdentityList_dual, can be established when constructing the dual connectivity to serve a UE, after the Xn interface has been established.

As part of the establishment of the Xn interface, the macro eNB and small cell eNB can exchange PLMN information with each other. In some examples, a new PLMN information element (IE) can be provided in a Neighbor Information IE, so that the PLMN information is exchanged as part of the PLMN IE in the Neighbor Information IE. In some examples, the Neighbor Information IE can be included in an Xn SETUP REQUEST message and an Xn SETUP RESPONSE message that are exchanged during the Xn interface establishment. A "new" IE refers to an IE that is not yet defined in current wireless network standards (e.g. 3GPP standards), but which may or may not later be defined by wireless network standards.

Selecting a PLMN for Multiple Connectivity by the UE

In some implementations, the data structure, plmn-IdentityList_dual, can be sent to the UE, from which the UE can select a PLMN identity. Sending plmn-IdentityList_dual to the UE allows the UE to select a PLMN that ensures the availability of dual connectivity (or multiple connectivity) by the UE with a macro cell and small cell. The PLMN identity selected by the UE is transferred by the UE to the macro eNB, which can then provide the selected PLMN identity to the MME 120 for forwarding to the HSS 123 for deriving $K_{ASME}$.

The data structure, plmn-IdentityList_dual, can be broadcast in a system information block (SIB). For example, plmn-IdentityList_dual can be included in SIB type 1 (SIB1), which can be broadcast by the macro eNB. An SIB carries various system information that relates to radio resource configurations. An SIB can be broadcast by an eNB to multiple UEs within the coverage area of the eNB.

An example SIB1 that includes plmn-IdentityList_dual is set forth below:

```
SystemInformationBlockType1 ::=    SEQUENCE {
    cellAccessRelatedInfo              SEQUENCE {
        plmn-IdentityList                  PLMN-IdentityList,
        plmn-IdentityList__dual            PLMN-IdentityList__Dual,
    ...
}
PLMN-IdentityList__Dual ::=        SEQUENCE (SIZE (1..max-dual-
                                       connection)) OF PLMN-
                                       IdentityInfo__Dual
PLMN-IdentityInfo__Dual ::=        SEQUENCE {
    plmn-Identity                      PLMN-Identity,
    cellIdentity-SeNB                  CellIdentity,
    cellReservedForOperatorUse         ENUMERATED {reserved,
                                       notReserved}
}
```

In the foregoing example SIB1, a parameter max-dual-connection is a predefined parameter that refers to a maximum number of dual-connection combinations a macro cell can have with neighbor small cells. For example, macro cell_A can have two possible dual-connection combinations: {macro_cell_A, small_cell_B}, {macro_cell_A, small_cell_C}.

A field PLMN-IdentityInfo_Dual in the example SIB1 includes the following sub-fields: PLMN-Identity (an identity of a PLMN), cellIdentity-SeNB (small cell identity in the PLMN with the associated PLMN-Identity), and cellReservedForOperatorUse (indicating whether or not a cell that is reserved for operator use).

In some implementations, the UE can take into account the detected macro cell identity and small cell identity when selecting plmn-Identity. For example, if the UE is able to detect (based on measurement by the UE) a satisfactory link quality to both macro_cell_A and small_cell_B, then the UE can select the plmn-Identity associated with the combination {macro_cell_A, small_cell_B}.

While setting up an RRC connection, the UE can set a field selectedPLMN-Identity in an RRC establishment message to the identity of the PLMN selected by upper layers from the PLMN(s) included in the plmn-IdentityListDual in SIB1, if the UE intends to establish a dual connection with the macro cell and small cell.

Selecting Multiple PLMN Identities

The foregoing refers to examples in which a single PLMN identity common to the macro cell and small cell(s) is selected, for use in deriving the base key $K_{ASME}$. In alternative implementations, different PLMN identities can be used for the macro cell and the small cell(s) when establishing dual connectivity. The macro cell can belong to a serving PLMN, while a small cell can belong to an assisting PLMN, which is one of the equivalent PLMNs of the UE. An equivalent PLMN is considered to be equivalent to the serving PLMN in terms of PLMN selection or reselection, cell selection or reselection, and handover. For example, a network operator can own both a Universal Mobile Telecommunications (UMTS) network and an E-UTRA network in the same country or in different countries. The different types of networks owned by the same network operator may be assigned different PLMN identities. These different PLMN identities of the different types of networks associated with the same network operator can be considered equivalent PLMN identities that are collected in an equivalent PLMN list. In other examples, multiple network operators may want to share a particular network; different PLMN identities for the shared network can be assigned to the different network operators; however, such PLMN identities are considered equivalent PLMN identities.

Two scenarios are contemplated when different PLMNs are used for the macro cell and the small cell. In a first scenario, only one $K_{ASME}$ is maintained for a UE. In such a scenario, the serving PLMN identity (e.g. the PLMN identity of the macro cell) is used by the HSS 123 to derive $K_{ASME}$. Note that the use of one $K_{ASME}$ can be implemented whether the small cell eNB is visible to the MME 120 or not. Note, however, that use of just one $K_{ASME}$ may be particularly useful for a user plane architecture where the small cell eNB is not visible to the MME 120.

In a second scenario, multiple $K_{ASME}$'s are maintained simultaneously for a UE. The macro cell PLMN identity is used to derive $K_{ASME,MeNB}$, which is used for producing keys for the wireless connection between the macro eNB and the UE. The assisting (or equivalent) PLMN identity for each small cell is used to derive $K_{ASME,SeNB}$ to produce keys for the connection between each small cell and the UE. Note that the use of multiple $K_{ASME}$'s is applicable to a user plane architecture where the small cell eNB is visible to the MME 120.

Figure 4:
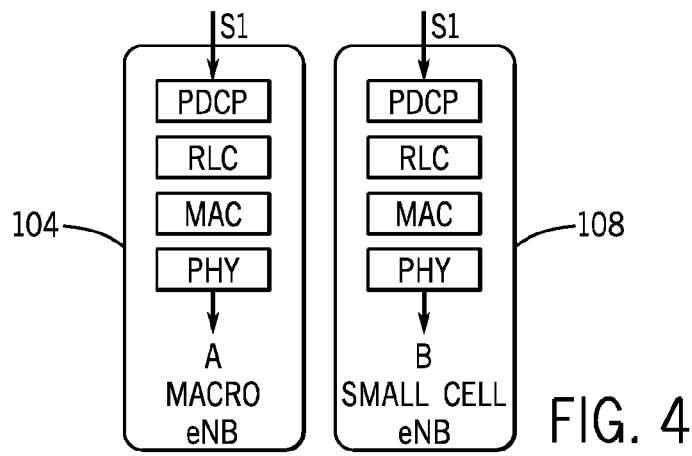
FIGS. 4 and 5 are block diagrams of protocol layers in a macro wireless access network node and a small cell wireless access network node, according to some examples.

An example of a user plane architecture where the small cell eNB is visible to the MME 120 is shown in FIG. 4, which shows protocol stack layers of the macro eNB 104 and a small cell eNB 108 (for just the downlink direction). According to the user plane architecture shown in FIG. 4, each of the macro eNB 104 and small cell eNB 108 includes the following protocol layers: a physical (PHY) layer, a medium access control (MAC) layer, a radio link control (RLC) layer, and a Packet Data Convergence Protocol (PDCP) layer.

The physical layer is the lowest layer in the corresponding node (UE or eNB). The physical layer can include networking hardware for transmitting and receiving signals over a wireless link. The MAC layer provides addressing and channel access control mechanisms. The RLC layer can provide at least some of the following example functionalities, as described in 3GPP TS 36.322, including: transfer of upper layer packet data units (PDUs); error correction, such as by using Automatic Repeat reQuest (ARQ); concatenation, segmentation, and reassembly of RLC service data units (SDUs); reordering of RLC data PDUs; and so forth.

The PDCP layer can provide at least some of the following functionalities in the user plane, as described in 3GPP TS 36.323, including: header compression and decompression; in-sequence delivery of upper layer PDUs; duplicate detection of lower layer SDUs; retransmission of PDCP SDUs; and so forth. The PDCP layer also includes security functionalities. For example, the security functionalities of the PDCP layer includes ciphering (encryption) and integrity protection for the control plane, and ciphering for the user plane.

Note that one protocol stack, including the physical, MAC, RLC, and PDCP layers, can be provided for each radio bearer. A radio bearer can refer to a data radio bearer (DRB) or a signaling radio bearer (SRB). A DRB is used to transport data of an E-UTRAN (Evolved Universal Terrestrial Radio Access Network) Radio Access Bearer (E-RAB) between a UE and an eNB. An SRB is used for carrying control messages, including RRC messages, between the UE and an eNB. There can be multiple DRBs and multiple SRBs for a given UE. Each radio bearer (DRB or SRB, except SRB0) is associated with a respective PDCP entity.

With the user plane architecture of FIG. 4, both the macro eNB 104 and the small cell eNB 108 are connected over an S1 interface to the core network 118 (including the MME 120 and SGW 122). As a result, the small cell eNB 108 is visible to the MME 120.

Figure 5:
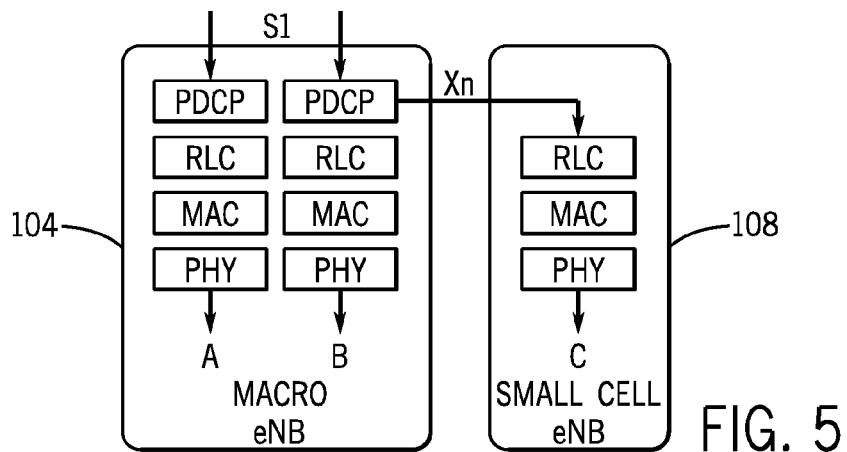

In alternative implementations, such as shown in FIG. 5, the small cell eNB 108 does not include the PDCP layer. Instead, the small cell eNB 108 includes just the physical layer, MAC layer, and RLC layer. A split from the PDCP layer occurs at the macro eNB 104, over the Xn interface between the macro eNB 104 and the small cell eNB 108. As with FIG. 4, FIG. 5 also just shows the downlink direction.

In the example of FIG. 5, the macro eNB 104 includes two types of protocol stacks (stack A and stack B), where each of stacks A and B includes a set of the following protocol layers: a physical layer, an MAC layer, an RLC layer, and a PDCP layer. Stack A does not support a radio bearer split, whereas stack B supports split radio bearers.

Selecting PLMN Identity(ies) for Multiple Connectivity by the Network

As discussed above, in some implementations the data structure, plmn-IdentityList_dual, is sent by the macro eNB to the UE to allow the UE to select a PLMN identity from plmn-IdentityList_dual, where the selected PLMN identity is common between the macro cell and small cell(s) to which the UE is to establish multiple concurrent connections.

In alternative implementations, instead of sending the data structure, plmn-IdentityList_dual, to the UE, the UE performs a selection of a PLMN identity in the traditional fashion, where the selected PLMN identity is from the plmn-IdentityList of the macro eNB. At this point, the UE would not know whether the selected PLMN supports dual connectivity with a neighbor small cell.

After the macro eNB receives the selected PLMN identity from the UE, the macro eNB determines if the selected PLMN identity received from the UE allows a dual connection with a neighbor small cell. This determination may involve interaction between the macro eNB and the small cell eNB, where the macro eNB and the small cell eNB can exchange information to determine whether or not the UE-selected PLMN is capable of providing dual connectivity of the UE with the macro cell and the small cell. Alternatively, the macro eNB can perform the determination by consulting the data structure, plmn-IdentityList_dual, stored at the macro eNB to ensure that the macro cell and the small cell can be paired up for dual connectivity. This consultation of plmn-IdentityList_dual allows the macro eNB to determine whether the small cell shares the UE-selected PLMN identity. If the UE-selected PLMN identity is in plmn-IdentityList_dual, then the macro eNB can confirm that the UE-selected PLMN identity supports dual connectivity.

In alternative implementations, the macro eNB can check configuration information for the UE stored at the macro eNB to determine whether a small cell has an equivalent PLMN (that is equivalent to the UE-selected PLMN). If so, dual connectivity can be allowed between the UE and the macro cell and small cell. In this case, multiple PLMN identities are employed, where the UE-selected macro cell PLMN identity is used for establishing a radio connection between the UE and the macro cell, while the equivalent small cell PLMN identity is used for establishing a radio connection between the UE and the small cell.

As noted above, two scenarios are possible with the use of multiple PLMNs for multiple connectivity between the UE and the macro cell and small cell(s). In a first scenario, one base key $K_{ASME}$ can be maintained, while in a second scenario, multiple $K_{ASME}$'s can be maintained.

If the macro eNB determines that dual connectivity is possible, the macro eNB identifies the small cell to the UE, and sends the relevant information of the small cell to the UE in a UE-specific RRC message. The RRC message may be part of the small cell eNB addition procedure, for example.

Multi-Connectivity Relationship Information

The dual-connectivity relationship between a macro cell and a neighbor small cell can be indicated by a specific attribute, such as an attribute of neighbor relationship (NR) information for the macro cell and the neighbor small cell. For example, in addition to the existing attributes, a new attribute, NoDualConnectivity, can be defined for a pair of a macro cell and a neighbor small cell. This neighbor small cell can be identified as a target cell. The NoDualConnectivity attribute can be defined as follows:

NoDualConnectivity: If set, the target cell (i.e. small cell) in the neighbor relationship (NR) is not to be used by the macro eNB for dual-connectivity.

Alternatively or additionally, the data structure, plmn-IdentityList_dual, can be stored as part of a conceptual Neighbour Relation Table (NRT) in the macro eNB. An Automatic Neighbour Relation (ANR) function in the eNB can maintain the plmn-IdentityList_dual for a pair of a macro cell and a small cell.

The ANR function in the macro eNB manages the conceptual NRT. A Neighbour Detection function in the ANR can find new neighbor cells and can add the detected new neighbor cells to the NRT. The ANR function also includes a Neighbour Removal Function that removes outdated NRs. For each cell of the macro eNB, the macro eNB maintains a respective NRT.

By pre-storing information pertaining to availability of dual connectivity (or more generally, multiple connectivity) at the macro eNB, the macro eNB would not have to perform a determination of availability of dual connectivity for each individual UE. Instead, the macro eNB can consult the pre-stored information pertaining to availability of dual connectivity to quickly ascertain whether a given neighbor small cell is available for dual connection (or multiple connection) for a given UE.

Key Hierarchy for Multiple Connectivity

At initial setup of a connection with a UE, an access network node key $K_{eNB}$ (discussed further above) is derived by the UE and the MME 120 from the base key $K_{ASME}$. From $K_{eNB}$, various access stratum keys (control plane keys and user plane keys) are derived, including for example, $K_{UPenc}$, $K_{RRCenc}$, and $K_{RRCint}$ as discussed above.

For the control plane, if the UE maintains two (or more) RRC connections, the UE has to keep two or more respective sets of RRC keys (a set contains $K_{RRCenc}$ and $K_{RRCint}$). For example, a first set of RRC keys can be maintained for a first RRC connection between the UE and the macro cell, while a second set of RRC keys can be generated when a second RRC connection between the UE and small cell is added, such as part of offloading one or more radio bearers (e.g. DRBs) to the small cell.

In examples where the UE maintains just one RRC connection to (e.g. with the macro cell), the UE would have to maintain just one set of RRC keys ($K_{RRCenc}$ and $K_{RRCint}$).

How user plane keys are maintained for the user plane depends upon the user plane architecture used. In a first user plane architecture, such as shown in shown in FIG. 5, the PDCP layer is located in just the macro eNB, and not in the small cell eNB. In such an arrangement, the user plane keys ($K_{UPenc}$) are kept at the macro eNB. User plane traffic with security protection (encrypted by $K_{UPenc}$) is sent from the macro eNB to the small cell eNB. With this arrangement, the control plane keys ($K_{RRCint}$, $K_{RRCenc}$) and the user plane keys ($K_{UPenc}$), which are all derived from the $K_{eNB}$, are kept in the same network node (e.g. macro eNB).

Two options are possible with the first user plane architecture:

(1) Just one set of user plane keys (encryption, and integrity protection if provided) is kept for the radio connection between the macro cell and the UE. In this option, a separate set of user plane keys does not have to be provided for data offloaded to the small cell.

(2) Two sets of user plane keys are kept, one set for the traffic between the macro cell and the UE, the other set for the traffic offloaded to small cell. This can be further realized by using one of the following options:

(a) Two $K_{eNB}$'s are maintained for a given UE, from which two (or more) sets of user plane keys are derived, respectively.

(b) One $K_{eNB}$ is maintained for a given UE, from which two (or more) sets of user plane keys are derived.

In a second user plane architecture, as shown in FIG. 4, the PDCP layer is located in both the macro eNB and the small cell eNB. With this architecture, at least keys for the user plane ($K_{UPenc}$) have to be provided in the small cell eNB. Two sets of user plane keys (encryption, and integrity protection if provided) are maintained, one set for the radio connection between the macro cell and the UE connection, the other set for the radio connection between the small cell and the UE. With the second user plane architecture, one of the following options can be used:

(a) The macro eNB and the small cell eNB each receives an access network node key $K_{eNB}$ from an MME, which is used to derive a user plane key ($K_{UPenc}$) for the respective radio connection. The key $K_{eNB}$ of the macro eNB is derived using a parameter associated with a macro cell, such as the NAS UPLINK COUNT of a NAS message associated with the macro-cell, cell ID of the macro-cell, or a carrier frequency of the macro-cell. Similarly, the key $K_{eNB}$ of the small cell eNB is derived using a parameter associated with the small cell, such as the NAS UPLINK COUNT of a NAS message associated with the small cell, cell ID of the small cell, or a carrier frequency of the small cell. The key $K_{eNB}$ of the macro eNB and the small cell eNB can be derived from a same base key $K_{ASME}$, or from two base keys $K_{ASME}$ respectively.

(b) The macro eNB derives a user plane key (e.g. $K_{UPenc}$) from its $K_{eNB}$ for protecting data communication between the UE and the macro cell. The macro eNB also derives a modified access network node key $K_{eNB}*$ from $K_{eNB}$ of the macro cell for the small cell eNB, sends the modified access network node key $K_{eNB}*$ to the small cell eNB, which uses $K_{eNB}*$ as $K_{eNB}$ to derive a user plane key (e.g. $K_{UPenc}$) for protecting data communication between the UE and the small cell.

(c) The macro eNB maintains a $K_{eNB}$ for the UE, while the small cell eNB does not maintain a $K_{eNB}$ for the UE. The small cell eNB only maintains the user plane keys (e.g. $K_{UPenc}$). In one embodiment, the macro eNB derives the user plane keys (e.g. $K_{UPenc}$) from a $K_{eNB}$ and passes the user plane keys relevant to the small cell to the small cell eNB for protecting data communication between the UE and the small cell.

Single $K_{eNB}$ for a UE

As discussed above, in the first user plane architecture (such as shown in FIG. 5) in which a PDCP layer is not provided in the small cell eNB for the dual-connected UE, just one $K_{eNB}$ can be generated for a given UE, for use in deriving keys for protecting information flow between the UE and each of the macro cell and small cell.

In a first option, the reconfiguration, addition and removal of a small cell radio connection can be performed by using RRC messaging, in a fashion similar to reconfiguring, adding, or removing a secondary cell when carrier aggregation is implemented. When carrier aggregation is implemented by a given eNB, one of the component carriers can be configured as a primary cell, or Pcell, while the remaining component carrier(s) is (are) configured as secondary cell(s), or Scell(s). The primary cell is used to communicate certain control information to UEs served by the primary cell. By using RRC messaging as noted above, a change of a security context does not have to be provided as a result of reconfiguring, adding, or removing a small cell radio connection. With this first option, to keep the key hierarchy as close to that (e.g. key hierarchy of FIG. 2) used for a single radio connection as possible, just one access network node key $K_{eNB}$ is generated for a given UE that has dual radio connections (or more generally, multiple radio connections).

In a second option, the addition and removal of a small cell radio connection can be performed as an intra-eNB handover (a handover between cells of the same eNB). The macro eNB selects a primary cell for the UE (which has a direct radio connection between macro eNB and UE). In the second user plane architecture (such as shown in FIG. 5), the primary cell can be either provided by a component carrier of link A (associated with protocol stack A in FIG. 5 that is not associated with bearer split) or by a component carrier of link B (associated with protocol stack B in FIG. 5 that is associated with bearer split).

Note that each of link A and link B can implement carrier aggregation that is composed of two or more component carriers. Link A and B may or may not uses the same carrier frequency in the component carrier(s). With the second option, an RRC message can be used to define the primary cell. The intra-eNB handover procedure for adding or removing a small cell radio connection triggers the macro eNB to derive a modified access network node key $K_{eNB}*$. In deriving $K_{eNB}*$, a key derivation function uses a physical cell identifier (PCI) of the primary cell and a downlink frequency information of the primary cell to produce $K_{eNB}*$ from $K_{eNB}$. In some examples, the downlink frequency information can include an E-UTRA Absolute Radio Frequency Channel Number-Downlink (EARFCN-DL) of the primary cell. The macro eNB then uses $K_{eNB}*$ as $K_{eNB}$ after the intra-eNB handover.

For the first user plane architecture (e.g. FIG. 5 architecture), one set of user plane keys can be derived from the single $K_{eNB}$; this set of user plane keys can be derived and used for both the macro cell-UE connection and the small cell-UE connection. The key hierarchy in such an arrangement can be similar to that depicted in FIG. 2.

Figure 6:
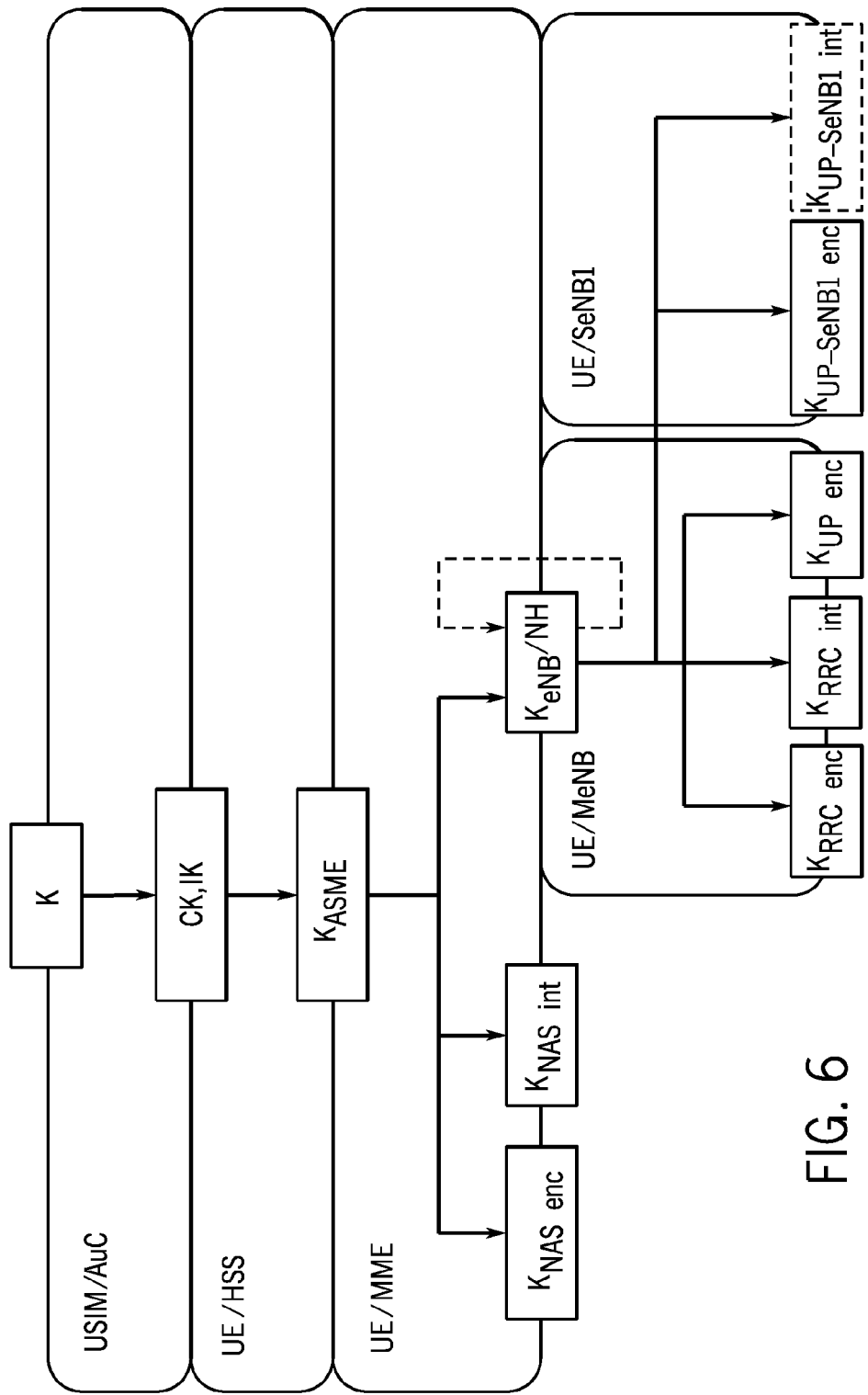
FIGS. 6 and 7 are schematic diagrams of example key hierarchies for dual wireless connections between a UE and multiple cells, according to various implementations.

Alternatively, for either the first user plane architecture (e.g. FIG. 5 architecture) or second user plane architecture (e.g. FIG. 4 architecture), two sets of user plane keys can be derived from the single $K_{eNB}$, with one set for the macro cell-UE connection, and the other set for the small cell-UE connection. The key architecture for this alternative implementation is shown in FIG. 6 (discussed further below).

As also discussed above, keys that can be derived from $K_{ASME}$ and $K_{eNB}$ can include the following: $K_{NASenc}$ and $K_{NASint}$ (for encryption and integrity protection of NAS information), $K_{RRCenc}$ and $K_{RRCint}$ (for encrypting and integrity protection of RRC information), and $K_{UPenc}$ (for encrypting user plane data).

When deriving the foregoing keys, according to some examples, the following parameters can be used to form a string S (as described in 3GPP TS 33.220):
  FC=0x15,
  P0=algorithm type distinguisher,
  L0=length of algorithm type distinguisher (i.e. 0x000x01),
  P1=algorithm identity,
  L1=length of algorithm identity (i.e. 0x000x01).

A derived key can be equal to the output of HMAC-SHA-256 computed on the string S using the key Key (which can be $K_{ASME}$ and $K_{eNB}$ as appropriate):
  derived key=HMAC-SHA-256 (Key, S).

Examples of values for respective different algorithm type distinguishers are provided in Table 1 below:

TABLE 1

| Algorithm Type Distinguisher (P0) | Value |
| --- | --- |
| NAS-enc-alg | 0x01 |
| NAS-int-alg | 0x02 |
| RRC-enc-alg | 0x03 |
| RRC-int-alg | 0x04 |
| UP-enc-alg | 0x05 |
| UP-int-alg | 0x06 |
| UP-SeNB1-enc-alg | 0x07 |
| UP-SeNB1-int-alg | 0x08 |

To derive $K_{NASenc}$ and $K_{NASint}$ from $K_{ASME}$, the algorithm type distinguishers (P0) are NAS-enc-alg and NAS-int-alg, respectively. To derive $K_{RRCenc}$ and $K_{RRCint}$ from $K_{eNB}$, the algorithm type distinguishers are RRC-enc-alg and RRC-int-alg, respectively, and to derive $K_{UPenc}$ from $K_{eNB}$, the algorithm type distinguisher is UP-enc-alg. For relay nodes, a user plane integrity key for integrity protection can be derived using the algorithm type distinguisher UP-int-alg.

For a dual-connectivity UE, the keys for the small cell radio connections can be derived from the same existing $K_{eNB}$, but with newly defined algorithm type distinguishers (P0), including UP-SeNB1-enc-alg and UP-SeNB1-int-alg in Table 1 above, for example.

As an example, assuming that one small cell-UE radio connection is established for user plane traffic in addition to an existing macro cell-UE radio connection, then a new set of user plane encryption keys (and possibly integrity keys) are derived. Using the UP-SeNB1-enc-alg and UP-SeNB1-int-alg algorithm type distinguishers, the following user plane keys (also shown in FIG. 6) can be derived for encryption and integrity protection of the user plane connection involving a small cell (referred to as SeNB1 in FIG. 6): $K_{UP-SeNB1enc}$ and $K_{UP-SeNB1int}$. If integrity protection is not employed, then only UP-SeNB1-enc-alg is used for deriving $K_{UP-SeNB1enc}$.

In another example, assume there are two small cells (identified as SeNB1 and SeNB2, for example) to which the UE is connected (in addition to the macro cell). In this case, two sets of user plane encryption keys (and possibly integrity keys) are derived for the small cell connections for SeNB1 and SeNB2. As a result, two sets of algorithm type distinguishers {UP-SeNB1-enc-alg, UP-SeNB1-int-alg; UP-SeNB2-enc-alg, UP-SeNB2-int-alg} can be defined for deriving the encryption and integrity keys of the user plane connections of SeNB1 and SeNB2, respectively. The algorithm type distinguishers for SeNB2 are illustrated in Table 2 below, which are in addition to the algorithm type distinguishers listed in Table 1.

TABLE 2

| | |
| --- | --- |
| UP-SeNB2-enc-alg | 0x09 |
| UP-SeNB2-int-alg | 0x0a |

If integrity protection is not employed, then only {UP-SeNB1-enc-alg, UP-SeNB2-enc-alg} are used.

Multiple $K_{eNB}$'s for a UE

For the second user plane architecture (e.g. FIG. 4 architecture) that has a separate PDCP layer in the small cell eNB (separate from the PDCP layer in the macro eNB) for a dual-connectivity UE, two sets of user plane keys are derived from two different $K_{eNB}$ keys, respectively. In this case, two different $K_{eNB}$'s are generated and maintained for a dual-connectivity UE. While two $K_{eNB}$'s can also be maintained for the first user plane architecture (e.g. FIG. 5 architecture), the ensuing discussion below assumes the second user plane architecture is employed.

When one or more DRBs of the UE are to be offloaded from the macro cell to a target small cell, $K_{eNB,SeNB}*$ is derived by the UE and the macro eNB from NH using the PCI and EARFCN-DL of the target small cell, where the $K_{eNB,SeNB}*$ is used as the new $K_{eNB,SeNB}$ for RRC and user plane traffic between the target small cell and the UE. Similarly, when the UE is to be disconnected from a first small cell and connected to a second small cell, a further instance of $K_{eNB,SeNB}*$ is derived by the UE and the macro eNB from NH using the PCI and EARFCN-DL of the second small cell, where the further instance of $K_{eNB,SeNB}*$ is used as the new $K_{eNB,SeNB}$ for RRC and user plane traffic between the second small cell and the UE.

Figure 7:
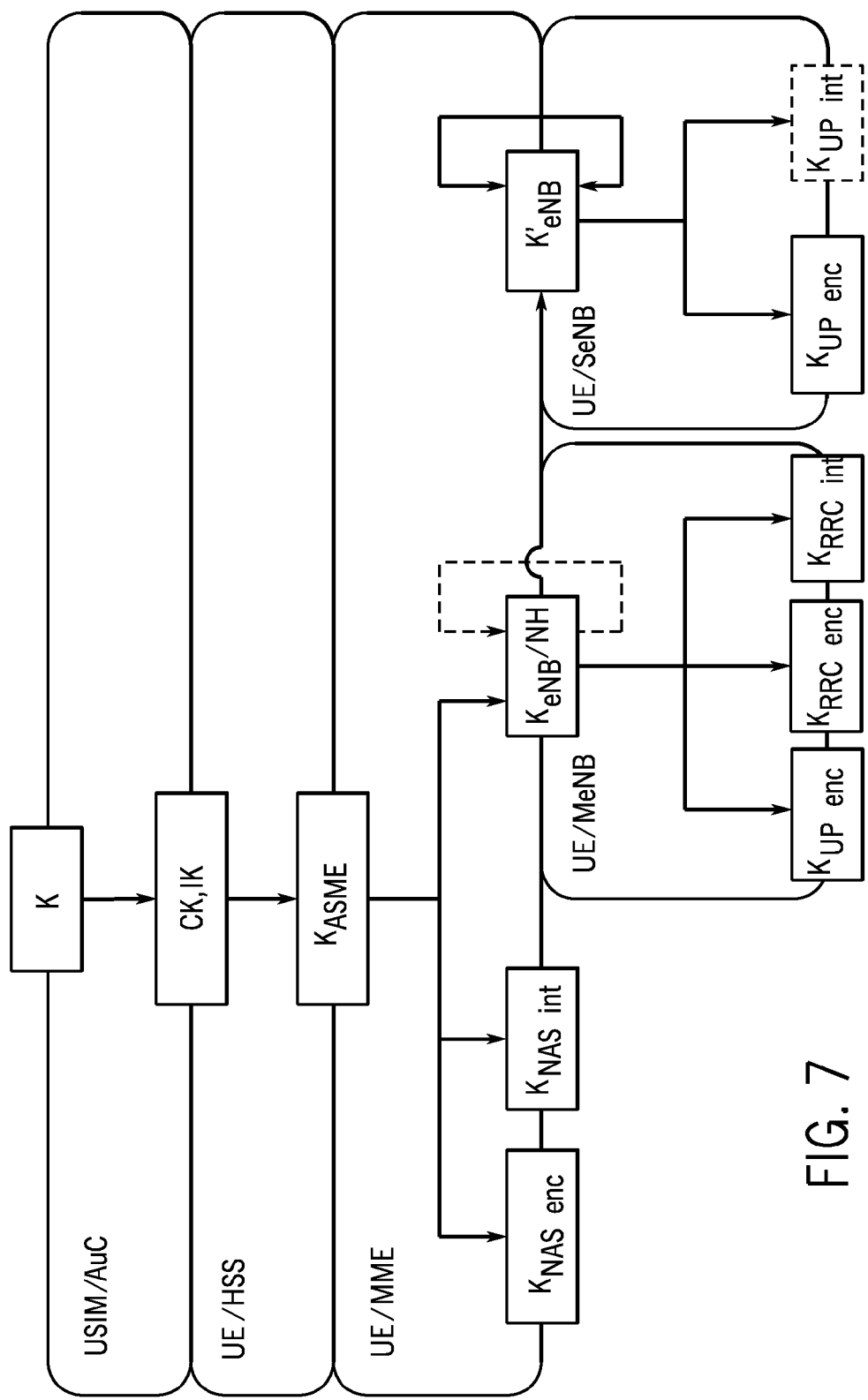

In this arrangement, there is a respective $K_{eNB}$ for each cell (macro cell or small cell) that the UE is connected to. The key hierarchy for this arrangement is illustrated in FIG. 7. Instead of deriving RRC keys ($K_{RRCint}$, $K_{RRCenc}$) and user plane keys ($K_{UPenc}$, $K_{UPint}$) from the same $K_{eNB}$, different sets of keys are derived from different eNBs for the macro cell and small cell, respectively. The RRC keys ($K_{RRCint}$, $K_{RRCenc}$) are derived from the $K_{eNB}$ associated with the macro cell ($K_{eNB}$ in FIG. 7). The user plane keys $K_{UPenc}$ for the macro cell are derived from $K_{eNB}$, while the user plane keys $K_{UPenc}$ (and possibly $K_{UPint}$) for the small cell (SeNB in FIG. 7) are derived from the $K'_{eNB}$ associated with the small cell.

When the UE moves from a first small cell to a second small cell, while connected to the same macro cell, the $K_{eNB}$ associated with the macro cell does not have to be updated; as a result, the keys $K_{RRCint}$, $K_{RRCenc}$ and $K_{UPenc}$ for the macro cell do not have to be updated. However, in response to the UE moving from the first small cell to the second small cell within the coverage of the macro cell, $K'_{eNB}$ is updated, and the associated user plane keys ($K_{UPenc}$ and possibly $K_{UPint}$) are updated.

Figure 8:
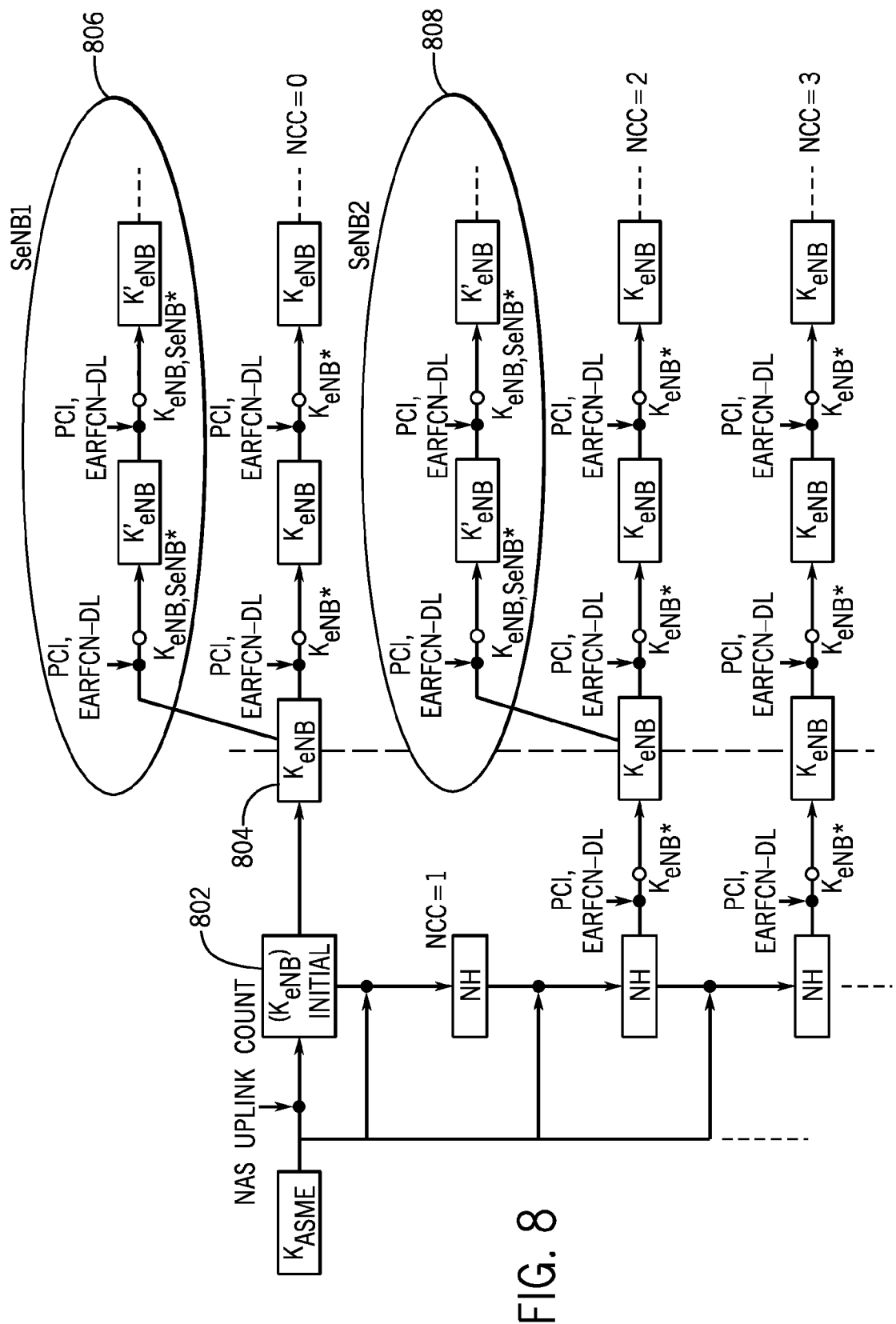
FIG. 8 is a schematic diagram of key chaining for dual wireless connections between a UE and multiple cells, according to some implementations.

FIG. 8 shows an example of updating keys in response to intra-eNB and inter-eNB handovers. Block 802 represents the initial computation of $K_{eNB}$ when the UE first establishes a radio connection with a macro cell. This initial $K_{eNB}$ from the MME is placed into use in the macro eNB as illustrated in block 804 in FIG. 8. Subsequent intra-eNB handovers (between cells of the macro eNB) cause horizontal key derivation of $K_{eNB}$, which involves producing $K_{eNB}*$ using the PCI and EARFCN-DL of the target macro cell. $K_{eNB}*$ is used by the target macro cell as $K_{eNB}$.

A handover between macro eNBs causes a vertical key derivation, as shown by a down arrow from block 802 in FIG. 8. Such inter-eNB handover results in the NH being computed, and the NCC being incremented. $K_{eNB}*$ is derived from NH as part of the inter-eNB handover, and this $K_{eNB}^*$ is used as the $K_{eNB}$ at the target eNB.

Maintaining just one set of {NH, NCC} can be performed to reduce complexity in key establishment and key change. In other words, {NH, NCC} is maintained at the macro eNB; a separate set of {NH, NCC} does not have to be maintained at the small cell eNB to which a UE has a dual connection.

If just one set of {NH, NCC} is maintained at the macro eNB, then $K'_{eNB}$ of a small cell eNB for the UE is horizontally derived using an intra-eNB handoverprocedure, as depicted in the oval 806 of FIG. 8. Oval 808 shows derivation of $K'_{eNB}$ for a potentially different small cell after a vertical key chaining that is performed as part of macro eNB handover.

When a small cell radio connection is added for the UE, to maintain just one set of {NH, NCC}, the macro eNB does not perform a vertical key derivation for the small cell eNB. To maintain key synchronization between the network and the UE, the $K'_{eNB}$ key for a small cell eNB is associated with a cell identifier of the small cell in an RRC message.

When the macro eNB performs handover, such as intra-eNB handover or inter-eNB handover (e.g. X2-based handover or S1-based handover), the macro eNB first releases the small cell-UE radio connection, so that there is no dual connection for the UE. Once the small cell-UE radio connection is released, a normal macro cell handover procedure and key derivation can be performed for a single-connection UE. Thus the NH derivation and NCC increment are only used for macro eNB-level handover.

If the second user plane architecture (e.g. FIG. 4 architecture) is implemented, then $K'_{eNB}$ of the small cell is derived as follows. If the small cell eNB in FIG. 4 employs multiple component carriers, then one component carrier is designated as the primary cell $PCell_S$ of the small cell eNB. This primary cell $PCell_S$ is in addition a primary cell $PCell_M$ that is designated for the macro eNB. The input to the key derivation function of $K'_{eNB}$ uses the PCI and downlink frequency EARFCN-DL of $PCell_S$.

If the first user plane architecture (e.g. FIG. 5 architecture) is implemented, when one or more DRBs of the UE are to be offloaded from the macro cell to a target small cell, $K_{eNB,SeNB}^*$ is derived by the UE and the macro eNB using the PCI and EARFCN-DL of the target small cell, where the $K_{eNB,SeNB}^*$ is used as the new $K'_{eNB}$ for the user plane traffic between the target small cell and the UE. A feature here of this arrangement is that, in addition to $K_{eNB}$ for the macro cell-UE radio connection, the macro eNB also holds $K'_{eNB}$ for data radio bearers of the small cell-UE link, since the PDCP layer for the small cell-UE radio link resides in the macro eNB, as shown in FIG. 8.

Key Handling for Multiple eNBs in a Cluster

Figure 9:
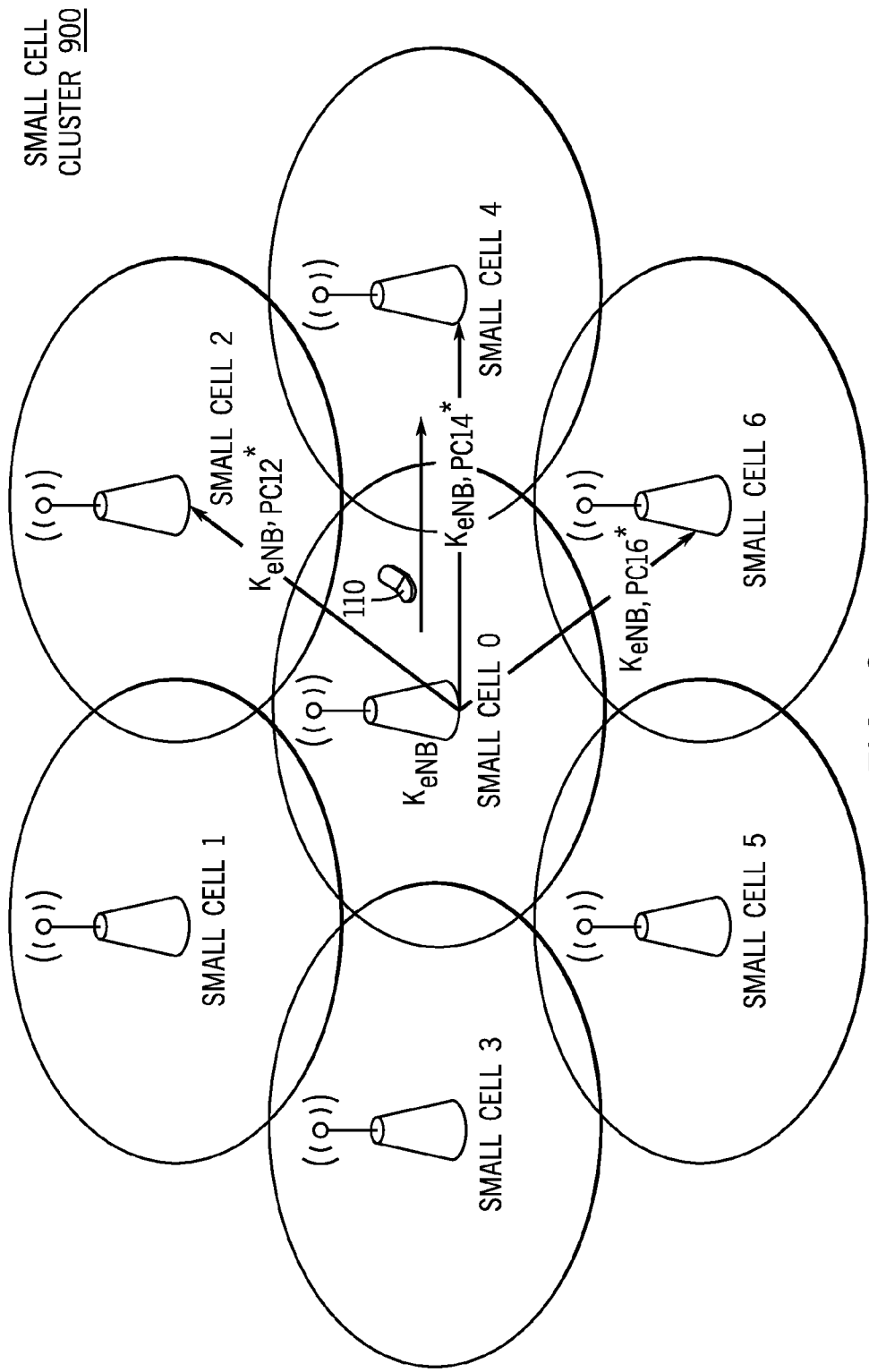
FIG. 9 is a schematic diagram of mobility of a UE in a cluster of small cells without macro cell coverage, according to some implementations.

The foregoing discussion refers to arrangements in which small cells are within a coverage area of a macro cell. In alternative implementations, macro cell coverage is not provided. In such alternative implementations, a cluster of small cells can be implemented, such as a small cell cluster 900 as shown in FIG. 9. In such a small cell cluster 900, the UE 110 can move between coverage areas of different small cells. In the example of FIG. 9, it is assumed that the UE 110 is initially in the coverage area of small cell 0, which has neighbor small cells 1-6 in the small cell cluster 900.

In the cluster 900, security for communications of the UE 100 can also be provided with keys. To reduce key generation or updating overhead, a PLMN identity, plmn-Identity, that is most common among all small cells in the cluster 900, and which is also acceptable to the UE 100, can be identified. By identifying such plmn-Identity and using it to produce $K_{ASME}$, the instances where $K_{ASME}$ would have to be updated as the UE 100 moves from small cell to small cell in the cluster 900 can be reduced.

In some examples, techniques as discussed above for deriving keys in the context of a macro cell and one or more small cells can be employed. In other examples, key derivation can be simplified by providing a list of multiple {cluster_ID, plmn-Identity} pairs for the small cell cluster 900, where this list is shared by all member small cells in the cluster 900. For each pair of {cluster_ID, plmn-Identity}, the cluster_ID is specific to the associated plmn-Identity, so that a different plmn-Identity value may have a different cluster_ID value for the cluster 900. The list that the cluster 900 is associated with may be broadcast by the small cells in the entire coverage area of the cluster 900. Upon receipt of the broadcast list, the UE 110 can select a plmn-Identity from the list. This selected plmn-Identity is valid for the entire coverage region of the cluster 900, and the selected plmn-Identity can be used for generating corresponding $K_{ASME}$ for the entire coverage region of the cluster 900. Note that a variation of the scheme is that each pair of {cluster_ID, plmn-Identity} may include a subset of the small cells in the cluster. For example, {cluster_ID A, plmn-Identity A} may be used by small cells {0,1,2,3,4}, {cluster_ID_B, plmn-Identity B} may be used by small cells {0,3,4,5,6}, while {clusterID_C, plmn-Identity_C} may be used by all small cells {0,1,2,3,4,5,6} in the cluster.

Due to the small footprint of each small cell in the cluster 900, handover from a source small cell to another small cell due to mobility of the UE 110 may be complicated by the fact that it may be difficult to know accurately which specific target small cell the UE 100 will move to. Also, if a radio link failure occurs, the UE 110 may have to connect to a neighbor small cell after the radio link failure. Thus for mobility robustness, it may be more beneficial to prepare multiple candidate target small cells for handover, rather than just one target small cell.

When preparing for handover of the UE 110 from a source small cell (e.g. small cell 0) to another small cell in the cluster 900, multiple security configurations can be prepared, one for each candidate target small cell that the UE 110 may potentially move to. A security configuration includes security information, which may include a key, a token, as well as other information, such as one or more of the following: a respective NCC, Evolved Packet System (EPS) security capabilities of the UE 110, security algorithms used in the source small cell for computing the token, and so forth.

The set of candidate target small cells to be prepared for handover by the source small cell eNB can be determined according to measurements performed by the UE of signals transmitted by various neighbor small cells of the source small cell. The set of candidate target small cells includes those target small cells indicated by the respective UE measurements as more likely to be handover targets.

In some examples, a token is calculated from VarShortMAC-Input, where VarShortMAC-Input is composed of a source cell radio network temporary identifier (C-RNTI), a source PCI, and a target cell identifier. VarShortMAC-Input is the input to an integrity algorithm, which outputs a 32-bit message authentication code. The token is the 16 least significant bits of the message authentication code. The token is carried as part of an RRCConnectionReestablishmentRequest message sent by the UE 110 to a target eNB to re-establish RRC connection after a connection failure, where the failure is due to, for example, a radio link failure, a handover failure, and so forth.

The security configurations generated by the source small cell eNB can be sent to respective target small cell eNBs. Also, the security configurations can be sent by the source small cell eNB to the UE 110. With multiple target small cells prepared, the UE 110 can move to any of the prepared target small cells, and establish a radio connection with such target small cell. This mitigates the shortcomings associated with not employing a macro cell, and the small footprint of a small cell in a cluster.

In FIG. 9, it is assumed that the UE 110 is initially in small cell 0 (the "source small cell"), which has a respective source small cell eNB. To handle the potential for handover of the UE 110, multiple target small cells (small cell 2, small cell 4, and small cell 6) are prepared, by sending each associated eNB a respective security configuration. Among other information as listed above, each security configuration includes a respective key, e.g. $K_{eNB,PCI2}^*$ (for small cell 2), $K_{eNB,PCI4}^*$ (for small cell 4), and $K_{eNB,PCI6}^*$ (for small cell 6). Each $K_{eNB,PCI2}^*$, $K_{eNB,PCI4}^*$, or $K_{eNB,PCI6}^*$ can be used by the respective target small cell 2, 4, or 6, respectively, as the corresponding $K_{eNB}$ that can be used to secure communication in the event that the UE establish connection.

Figure 10:
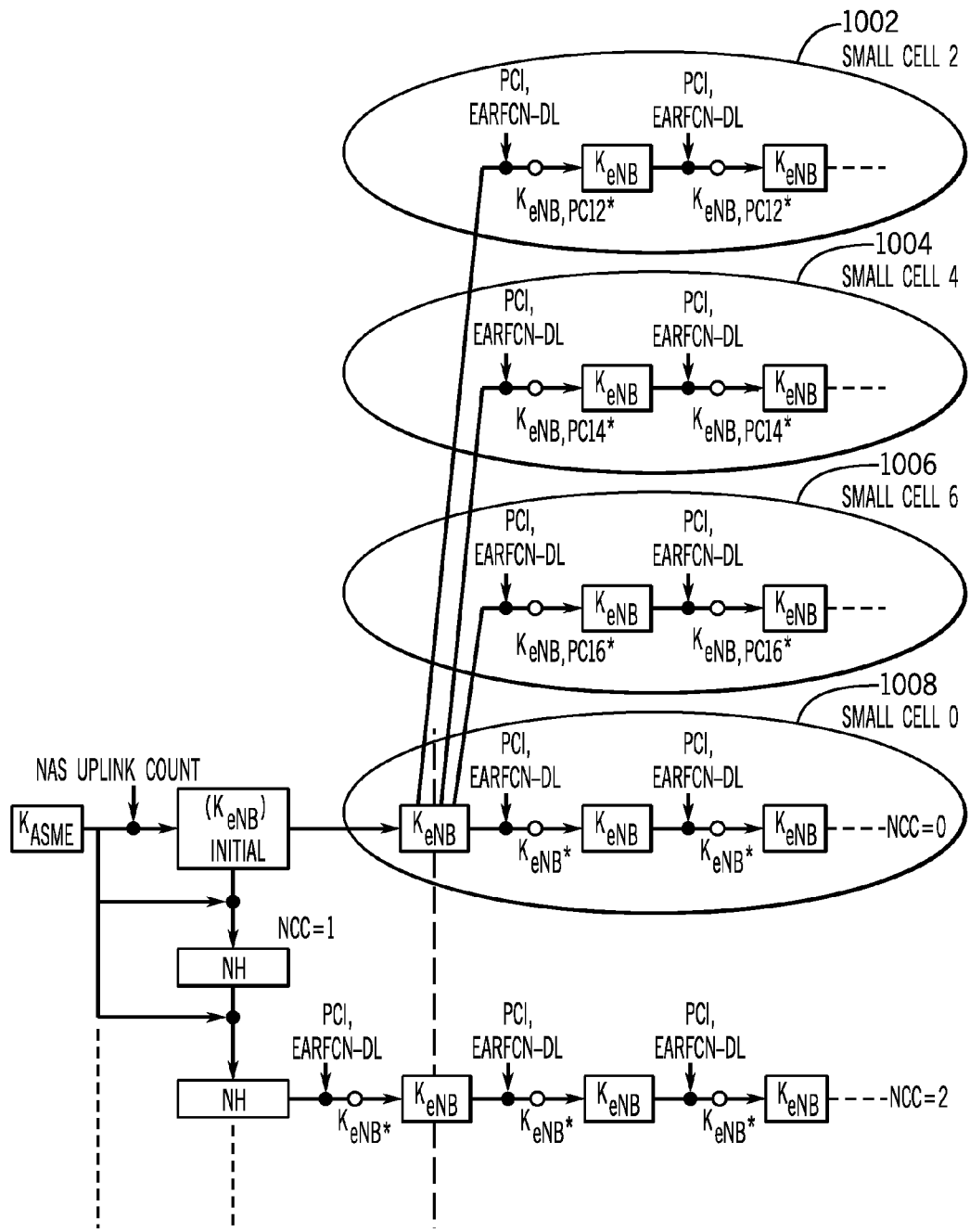
FIG. 10 is a schematic diagram of key chaining for a handover procedure of a UE in the cluster of cells, according to further implementations.

The corresponding key chaining for $K'_{eNB}$ preparation of multiple target small cells is illustrated in FIG. 10. Ovals 1002, 1004, and 1006 in FIG. 10 represents the derivation of $K_{eNB,PCI2}^*$, $K_{eNB,PCI4}^*$, and $K_{eNB,PCI6}^*$, respectively, from the $K_{eNB}$ (represented by block 1008) of the source small cell.

In some examples, a timer (which can be referred to as $T_{HOprep}$, for example) can be provided for a handover preparation phase at the source small cell eNB, assuming that multiple candidate target small cell eNBs are involved. When a first HANDOVER REQUEST message is sent by the source small cell eNB to the first candidate target small cell eNB, the timer $T_{HOprep}$ is started. When a HANDOVER REQUEST ACKNOWLEDGE messages (for acknowledging the HANDOVER REQUEST message) from all candidate target small cell eNBs are received, the timer $T_{HOprep}$ is stopped.

Otherwise, if $T_{HOprep}$ expires before the HANDOVER REQUEST ACKNOWLEDGE messages from all candidate target small cell eNBs are received by the source small cell eNB, the candidate target small cell eNBs that have not acknowledged (by sending a respective HANDOVER REQUEST ACKNOWLEDGE message) are no longer considered candidate target small cell eNBs by the source small cell eNB, and their mobility information is not passed to the UE 110. Effectively, the source small cell eNB removes the target small cell eNBs that have not acknowledged from the set of candidate small cell eNBs. The source small cell eNB can send a HANDOVER CANCEL message to each target small cell eNB that has not acknowledged to formally cancel the handover preparation of that target small cell.

When a HANDOVER REQUEST ACKNOWLEDGE message is received by the source small cell eNB from any candidate target small cell eNB, the source small cell eNB can respond by sending to the UE 110 an RRCConnection-Reconfiguration message to convey the respective mobility control information, without waiting for the acknowledgment from other candidate target small cell eNBs. This helps to reduce handover failure. The mobility control information included in the RRCConnectionReconfiguration message can include various information, including the carrier frequency of target cell and various physical channel configuration and random access channel (RACH) procedure information about the target cell.

There may be multiple RRCConnectionReconfiguration messages sent from the source small cell eNB to the UE 110, one for each candidate target small cell eNB that has acknowledged. The delivery of multiple RRCConnection-Reconfiguration messages can be facilitated by maintaining a dual connection towards the UE 110, one connection from the source small cell eNB to the UE 110, and the other from a target small cell eNB to the UE 110. Note that the UE 110 does not have to immediately break the connection to the source small cell eNB when performing a random access procedure, on a RACH with a target small cell eNB.

Once the UE 110 has been successfully handed over to a target small cell eNB, then the source small cell eNB can send a HANDOVER CANCEL message to other prepared target small cells.

Note that while the procedure described above is for mobility handling among a cluster of small cells, a similar procedure can be applied in other scenarios, such as a scenario that includes a deployment of a macro cell and one or more small cells, or a deployment of multiple macro cells. Note also that variations of the procedure described above are possible. For example, the timer $T_{HOprep}$ is stopped a select subset of the candidate target small cell eNBs are received. In another example, the source small cell eNB can aggregate mobility control information of multiple target small cells into a single RRCConnectionReconfiguration message to send to the UE 110.

Figure 11:
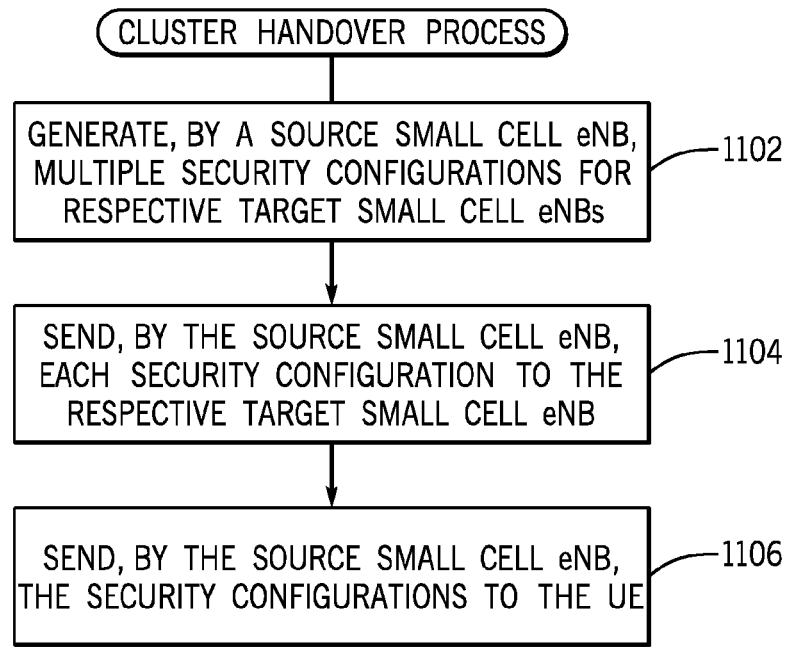
FIG. 11 is a flow diagram of a cluster handover process, according to further implementations.

FIG. 11 is a flow diagram of a process according to some implementations for use in performing handover of the UE 110 in the cluster 900 of small cells. The source small cell eNB generates (at 1102), for the UE 110, multiple security configurations, where each security configuration is associated with a different eNB in a set of candidate target small cell eNBs. The source small cell eNB sends (at 1104) each security configuration to the respective candidate target small cell eNB. In addition, the source small cell eNB also sends (at 1106) the security configurations to the UE 110.

The UE 110 can use a security key of a security configuration of a particular one of the target small cell eNBs to derive further keys that can be used for a radio connection established between the UE and the target small cell eNB.

System Architecture

Figure 12:
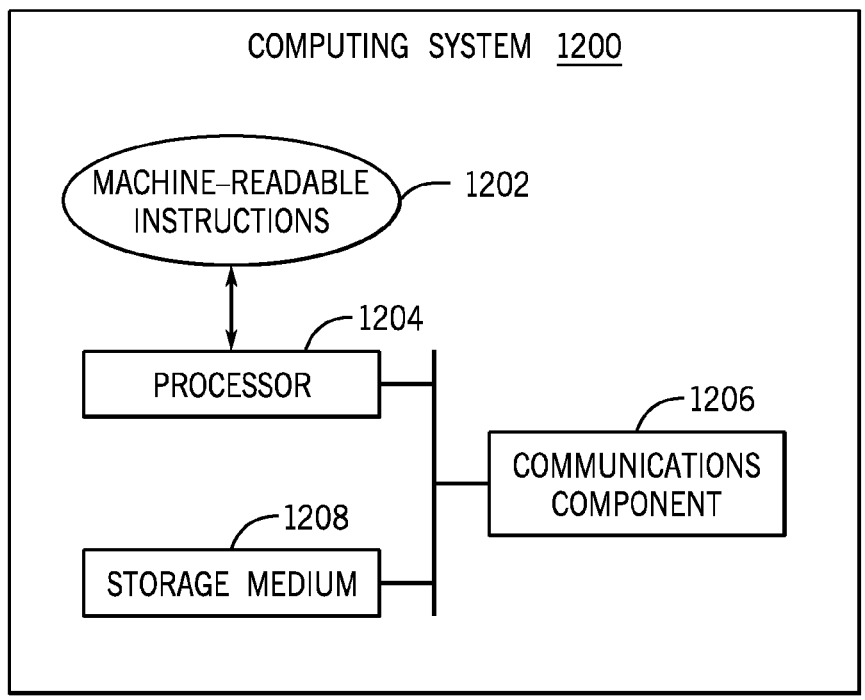
FIG. 12 is a block diagram of an example system according to some implementations.

FIG. 12 depicts a computing system 1200, which can be any of the macro eNB 104, small cell eNB 108, or other network node discussed above. The computing system 1200 includes machine-readable instructions 1202, which are executable on a processor (or multiple processors) 1204 to perform various tasks discussed above. A processor can include a microprocessor, microcontroller, processor module or subsystem, programmable integrated circuit, programmable gate array, or another control or computing device.

The processor(s) 1204 can be coupled to a communication interface (or communication component) 1206 to perform communications. For example, the communication interface 1206 can perform wireless communication over an air interface, or perform wired communication over a wired connection. In some cases, the computing system 1200 can include multiple communication interfaces 1206 to communicate with respective different network nodes.

The processor(s) 1204 can also be coupled to a computer-readable or machine-readable storage medium (or storage media) 1208, for storing data and instructions. The storage medium or storage media 1608 can include one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In general, according to some implementations, a first radio connection is established between a first cell and a user equipment (UE). A network identity of a second cell is determined based on a first set of at least one network identity associated with the first cell, where the second cell is associated with a second set of at least one network identity, and the determined network identity is useable for establishing a second radio connection between the second cell and the UE.

In general, according to further implementations, a UE includes a wireless communication component to receive, from a wireless access network node of a first cell, a list of network identifiers, the network identifiers being composed according to a first set of network identifiers for the first cell, and a second set of network identifiers for a second cell, the first cell and the second cell to provide concurrent wireless connections with the UE. The UE further includes at least one processor configured to select, from the list of network identifiers, a network identifier to use for generating a key for protecting data communication of the UE.

In general, according to further implementations, a source wireless access network node generates, for a UE, a plurality of security configurations, where each security configuration is associated with a different node in a set of candidate target wireless access network nodes. The source wireless access network node sends each security configuration to the respective candidate target wireless network node. The source wireless access network node sends security information of the plurality of security configurations to the UE.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    establishing a first radio connection between a first cell and a user equipment (UE);
    determining a network identity of a second cell based on a first set of at least one network identity associated with the first cell, wherein the second cell is associated with a second set of at least one network identity, the determined network identity useable for establishing a second radio connection between the second cell and the UE, and wherein determining the network identity of the second cell comprises identifying a network identity in the second set that is common with a network identity in the first set;
    sending, by a wireless access network node of the first cell to the UE, a list that includes one or more network identities that are common between the first set and the second set; and
    receiving, by the wireless access network node from the UE, a selection of a network identity from the list.

2. The method of claim 1, further comprising:
    receiving, by the wireless access network node of the first cell, an access network node key derived from a base key for use in protection of data communication of the UE with the first cell, and
    receiving, by a wireless access network node of the second cell, an access network node key derived from the base key for use in protection of data communication of the UE with the second cell.

3. An article comprising at least one non-transitory machine-readable storage medium storing instructions that upon execution cause a wireless access network node of a first cell to:
    establish a first radio connection between the first cell and a user equipment (UE);
    receive, from the UE, a network identity of the first cell selected from a first set of at least one network identity associated with the first cell; and
    determine a network identity of a second cell based on the received network identity of the first cell, wherein the second cell is associated with a second set of at least one network identity, the determined network identity useable for establishing a second radio connection between the second cell and the UE.

4. The article of claim 3, wherein determining the network identity of the second cell is based on selecting from the second set the network identity of the second cell that is common with the received network identity of the first cell.

5. The article of claim 3, wherein determining the network identity of the second cell is based on selecting from the second set the network identity of the second cell that it is an equivalent network identity of the received network identity of the first cell for the UE.

6. A method comprising:
    establishing a first radio connection between a first cell and a user equipment (UE);
    determining a network identity of a second cell based on a first set of at least one network identity associated with the first cell, wherein the second cell is associated with a second set of at least one network identity, the determined network identity useable for establishing a second radio connection between the second cell and the UE; and
    storing, by a wireless access network node of the first cell, an indicator associated with the second cell to indicate whether the second cell is eligible to have a multiple connectivity relationship with the first cell.

7. The method of claim 6, further comprising
    determining a network identity of the first cell;
    generating a security key for the UE according to the network identity of the first cell.

8. A method comprising:
    establishing a first radio connection between a first cell and a user equipment (UE);
    determining a public land mobile network (PLMN) identity of a second cell based on a first set of at least one PLMN identity associated with the first cell, wherein the second cell is associated with a second set of at least one PLMN identity, the determined PLMN identity useable for establishing a second radio connection between the second cell and the UE;

establishing a base key for the UE; and receiving, by a wireless access network node of the first cell, an access network node key derived from the base key for use in protection of data communication of the UE with both the first cell and the second cell.

9. The method of claim 8, further comprising:

sending, to the UE, the determined PLMN identity of the second cell.

10. The method of claim 8, further comprising generating a security key for the UE according to the PLMN identity of the second cell.

11. The method of claim 8, wherein a key is used for protection of data communication of the UE with the second cell, and wherein a separate key is used for protection of data communication of the UE with the first cell.

12. The method of claim 8, further comprising:

deriving, by the wireless access network node of the first cell, a set of one or more user plane keys from the access network node key, the set of one or more user plane keys useable in protection of data communication of the UE with both the first cell and the second cell.

13. The method of claim 8, further comprising:

deriving, by the wireless access network node of the first cell, a first set of one or more user plane keys useable in protection of data communication of the UE with the first cell, and deriving, by a wireless access network node of the second cell, a second set of one or more user plane keys useable in protection of data communication of the UE with the second cell.

14. The method of claim 8, further comprising:

deriving, by the wireless access network node of the first cell, a first set of one or more user plane keys from the access network node key, the first set of one or more user plane keys useable in protection of data communication of the UE with the first cell;

deriving, by the wireless access network node of the first cell, a modified access network node key from the access network node key; and sending, by the wireless access network node of the first cell to an wireless access network node associated with the second cell, the modified access network node key that is useable by the wireless access network node associated with the second cell to derive a second set of one or more user plane keys useable in protection of data communication of the UE with the second cell.

15. The method of claim 8, further comprising:

determining at least one user plane key from the access network node key using an algorithm type distinguisher for the second cell.

16. The method of claim 8, wherein the PLMN identity of the second cell identifies a PLMN that includes the second cell and that serves the UE, and wherein a PLMN identity in the first set of at least one PLMN identity associated with the first cell identifies a PLMN that includes the first cell and that serves the UE.

17. A method comprising:

establishing a first radio connection between a first cell and a user equipment (UE);

determining a network identity of a second cell based on a first set of at least one network identity associated with the first cell, wherein the second cell is associated with a second set of at least one network identity, the determined network identity useable for establishing a second radio connection between the second cell and the UE; and receiving, by a wireless access network node of the first cell, plural access network node keys derived from a base key for use in protection of data communication of the UE with the respective first cell and second cell.

18. The method of claim 17, wherein a first of the plural access network node keys is derived using a parameter associated with the first cell, and a second of the plural access network node keys is derived using a parameter associated with the second cell.

19. A user equipment (UE) comprising:

a wireless communication interface to receive, from a wireless access network node of a first cell, a list of network identifiers, the network identifiers being composed according to a first set of network identifiers for the first cell, and a second set of network identifiers for a second cell, the first cell and the second cell to provide concurrent wireless connections with the UE; and at least one processor configured to:

select, from the list of network identifiers, a network identifier to use for generating a key for protecting data communication of the UE.

* * * * *